United States Patent
Brown et al.

(10) Patent No.: US 12,213,395 B2
(45) Date of Patent: Feb. 4, 2025

(54) MONITORING AND INTELLIGENCE GENERATION FOR FARM FIELD

(71) Applicant: 6th Grain Corporation, Bethesda, MD (US)

(72) Inventors: Molly Elizabeth Brown, Underhill, UT (US); Min Feng, Ellicott City, MD (US); Vladimir Eskin, Bethesda, MD (US)

(73) Assignee: 6th Grain Corporation, Bethesda, MD (US)

( * ) Notice: Subject to any disclaimer, the term of this patent is extended or adjusted under 35 U.S.C. 154(b) by 608 days.

(21) Appl. No.: 17/447,984

(22) Filed: Sep. 17, 2021

(65) Prior Publication Data
US 2023/0091677 A1    Mar. 23, 2023

(51) Int. Cl.
| | |
|---|---|
| G06Q 50/02 | (2024.01) |
| A01B 79/00 | (2006.01) |
| G06N 20/00 | (2019.01) |
| G06V 10/75 | (2022.01) |
| G06V 20/10 | (2022.01) |

(52) U.S. Cl.
CPC .......... *A01B 79/005* (2013.01); *G06N 20/00* (2019.01); *G06Q 50/02* (2013.01); *G06V 10/758* (2022.01); *G06V 20/188* (2022.01)

(58) Field of Classification Search
CPC .... A01B 79/005; G06N 20/00; G06V 20/188; G06V 10/758; G06Q 50/02
See application file for complete search history.

(56) References Cited

U.S. PATENT DOCUMENTS

| | | | |
|---|---|---|---|
| 2015/0278640 A1* | 10/2015 | Johnson | G06V 20/188 382/110 |
| 2016/0239709 A1* | 8/2016 | Shriver | G06V 20/188 |
| 2017/0329048 A1* | 11/2017 | Lemos | G06F 17/18 |
| 2018/0189564 A1* | 7/2018 | Freitag | G06F 18/214 |
| 2018/0267008 A1* | 9/2018 | Sutton | G06T 7/0016 |

OTHER PUBLICATIONS

CN111932457_A (Year: 2020).*

* cited by examiner

*Primary Examiner* — Manish S Shah
*Assistant Examiner* — Sharad Timilsina
(74) *Attorney, Agent, or Firm* — Schwegman Lundberg & Woessner, P.A.

(57) ABSTRACT

Various embodiments described herein provide monitoring and intelligence generation for one or more farm fields by: using remote sensing to monitor progress of a developing crop; comparing a user's field to another field in the area; providing cropped area extent estimates for a current season; using one or more disease risk models to determine disease risk (or disease pressure) with respect to a field; or some combination thereof.

19 Claims, 29 Drawing Sheets

FIG. 22

MONITORING AND INTELLIGENCE GENERATION FOR FARM FIELD

TECHNICAL FIELD

The present disclosure relates generally to crop monitoring, and, more particularly, various embodiments described herein provide for systems, methods, techniques, instruction sequences, and devices that provide monitoring and intelligence generation for one or more farm fields.

BACKGROUND

Crop monitoring is critical to the global food system, where two-thirds of food calories worldwide is presently derived from four staple crops—wheat, maize, rice, and soybean. Weather conditions, such as deficits in precipitation, increases in temperatures, and changes in soil moisture can affect food production over large areas. In addition to abiotic stresses, crop losses due to pests and diseases. Declines in crop yield can translate into large economic losses. Additionally, as the climate changes, threats to crop yields are increasing. Over time, unpredictable, extreme weather is characterizing more growing seasons.

Conventional (digital) crop monitoring tools provide an understanding of the impact of various conditions (e.g., weather, pests, disease, etc.) on crop production. Crop monitoring tools can monitor productivity across hundreds of fields, and can ensure overall profitability of a farming concern, especially in times of low commodity prices and rising costs (e.g., of labor, inputs, fuel, machinery, rent, etc.). Monitoring fields using a digital crop monitoring tool can ensure prompt action when productivity falls, as well as ensure that decisions made later in the season are appropriate.

BRIEF DESCRIPTION OF DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIGS. 22 through 27 illustrate example user interfaces for a field passport for an individual farm field of interest, according to various embodiments of the present disclosure.

DETAILED DESCRIPTION

Figure 1:
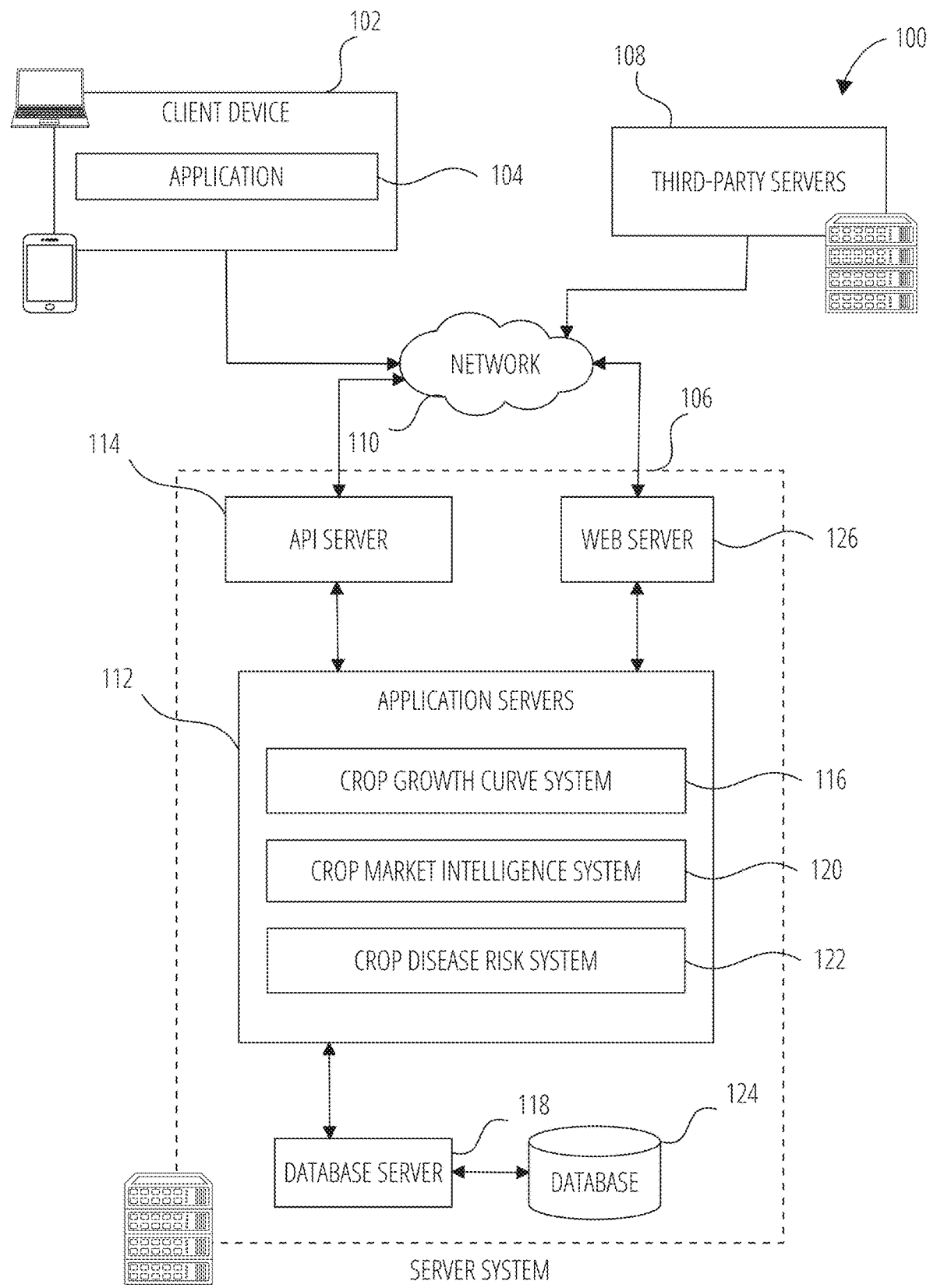
FIG. 1 is a diagrammatic representation of a networked environment in which the present disclosure may be deployed, in accordance with some examples.

Using satellite remote sensing of biomass, conventional crop monitoring tools can generate maps of field variability that can provide site-specific information about the permanent factors (e.g., climate and soil properties) and management factors (e.g., nutrients supply, pest problems, irrigation uniformity in irrigated lands) that affect crop productivity. The conventional crop monitoring tools can receive rates of planned agronomic inputs (e.g., seeding rates, water, and fertilizers) can adapt them to actual demand and needs of a crop. Although conventional crop monitoring tools can deliver satellite observations of canopy health to growers managing fields, such tools often require a great deal of data input regarding each field, such as the planting date, variety planted, inputs used, and timing of application. Some conventional crop monitoring tools require the user to have a comprehensive understanding of satellite data imagery or models to interpret the response required on a field. In agricultural settings where users are generally less used to using sophisticated tools, the adoption rate and continued use of remote sensing crop monitoring tools can be low due to increased tool complexity for the user. Furthermore, recently computational power and satellite data availability have reached the point where observations of fields taken from space can be provided in near-real time, at a resolution where the field can be observed directly, and in a format that is easily actionable.

Various embodiments described herein provide a system or method for monitoring and intelligence generation for one or more farm fields (or crop fields), where the system or method can: use remote sensing to monitor progress of a developing crop (e.g., monitor the progress of fields without entering field data on crop type, planting date and field outline); compare a user's field to the another field (e.g., better or best performing fields) in the area; provide cropped area extent estimates for a current season; use one or more disease risk models (e.g., for multiple crops and diseases for today and days into the future) to determine disease risk (or disease pressure) with respect to a field; or some combination thereof. In particular, some embodiments can provide a user commercial farmer or growers, crop input provider, a client with a large number of fields, etc.) with a combination of decision crop monitoring support tools, and can combine one or more decision support models (e.g., satellite remote sensing and meteorological models) into one to provide the user with improved field-level decision making. For example, some embodiments use remote sensing data (e.g., moderate resolution satellite and meteorological data) and artificial intelligence (AI)/machine learning (ML) to provide a system that includes, without limitation, crop growth curve generation, crop disease risk analysis, and market intelligence (e.g., regional market intelligence), which can work together (e.g., integrated together and passing information between them) to provide crop health and market intelligence for a wide range of users (e.g., clients) anywhere in the world. For instance, a user can use an embodiment described herein to monitor progress of each field's crop as it develops, to rank two or more fields, to compare fields to each other (e.g., compare a given field's potential yield to those of surrounding fields whose yield is known), or to take prompt action before productivity loss occurs. Some embodiments provide a user with access monitoring analysis at the pixel level for a geographic location. Further, some embodiments use satellite-data gap-removal features to provide a flexibility and robustness.

Various embodiments described herein can provide one or more of the following: a crop growth curve generation; a crop growth band (e.g., optimal growth band for comparing to the crop growth curve of a specific field) generation; a simulated field performance index generation for a field; market intelligence generation based on geographic region (also referred to herein as regional market intelligence); and crop disease risk analysis. Additionally, various embodiments described herein can be implemented as a crop monitoring software tool, which can be accessible (e.g., in the field) by a user through a client device (e.g., mobile phone, tablet, laptop, desktop computer) using a graphical user interface (e.g., web-based interface) or via a stand-alone application.

Use of an embodiment can provide, for example, in field analytics, supply chain, sales force optimization, decision support for agronomists, or some combination thereof. A embodiment described herein can be used, for example, with row crops, perennial crops, or tree crops, and can be available for different (e.g., all) agriculture areas globally. Further, by use of some embodiments, a user can monitor their fields without keying in extensive field data (unlike various conventional crop monitoring tools). For instance, some embodiments provide the ability to upload or auto populate field information, thereby streamlining information provision with minimal data input by a user. For instance, an embodiment can apply a predictive deep learning tool over existing field data and satellite and weather data to generate a profile (e.g., Virtual Farmer Profile), which can greatly reduce the burden for users to continually update field information, which can enhance the usability of an embodiment and can reduce the chance of a user abandoning use of an embodiment (e.g., when a new crop is planted). An embodiment can, for example, obviate the need for a user to continually enter or update data for fields in regions where there are several seasons per year and changes in crop type, variety, and planting dates across fields. Additionally, some embodiments render use of user-provided information, such as planting date and crop type, as optional. For instance, a simulated productivity index, automatic field boundary identification, population of key field information, or a combination thereof can enable an embodiment described herein to provide a user (e.g., who cannot or will not input field information) with a technical solution for crop monitoring.

User of an embodiment described herein can include, without limitation, seed growers (e.g., commercial cereal and oil seed growers), crop input providers, and other clients who provide services to agricultural fields face the critical challenge of monitoring progress of crop of their fields without having to travel to each one or spending-time and effort entering field data (e.g., on crop type, planting date and field outline in digital tools). Using satellite remote sensing and meteorological information, various embodiments described herein provide a technical solution for easily tracking the progress of an individual field's crop as it develops and to compare its potential yield to those of surrounding fields whose yield is known. According to some embodiments described herein, spatially explicit time series analysis is used to provide field-specific monitoring with frequent updates (e.g., every 3-5 days) throughout a season. Additionally, such embodiments can provide a user with easy-to-understand monitoring of a crop on a specific field.

A system of an embodiment can use a prior year's (e.g., last year's) yield information from one or more best-performing fields in a geographical region to generate a visual representation of a crop growth band, which can be regarded as a preferred, desired, or optimal growth band. Such a crop growth band can allow a user to relate (e.g., compare) the evolution of crop growth in one or more of the user's specific fields (e.g., as visually represented by a crop growth curve described herein) to known high-performing fields frequently (e.g., each day) during the season, which are visually represented by the crop growth band. By tracking the growth of the crop of a specific field in comparison to the crop growth band over time, a user can identify one or more problems with respect to the specific field early enough to facilitate intervention by a farm manager. Additionally, if the one or more problems persist, yield deficits can be planned for, and crop protocols can be adjusted in the peak vegetative part of the season to ensure farm profitability.

Accordingly, a system of an embodiment can provide a software-based decision support tool that can provide constant (e.g., daily) information that relates a users' crop in cultivation to one or more of the best performing crops in a geographical region. The system can provide an easy way for a user (e.g., growers, distributors, and agronomists) to monitor one or more of their fields of interest by defining or uploading field boundaries for those fields of interest. For instance, a user can upload a shape file that defines one or more field boundaries for an individual field. The user can also define or upload data regarding other details for the one or more fields of interest, such as planting date, crop type, crop variety, and production history. As used herein, a farm field or field can comprise a geographical region (or region) defined by boundaries, where the field can have a uniform crop management throughout a season (e.g., growing season), and where the uniform crop management can include field preparation, planting, weeding, fertilization, harvesting, and the like. By saving the user defined uploaded data for one or more of their fields of interest, the system can minimize user data input from one season to the next. Additionally, for some embodiments, the system can automatically populate a crop type (e.g., soybean, maize, sugarcane, cotton, or other crop), planting date, and harvesting date.

After a user logs into a platform of an embodiment, the user can use a graphical user interface to zoom into a geographical region where one or more of their fields of interest are located place name. For instance, the user can zoom into the geographical region manually (e.g., via graphical user interface buttons) or via a search box where they can enter geographical coordinates or a place name (e.g., 'Atlăntica, Mato Grosso'). For some embodiments, a crop growth band (or crop growth curve band) can be provided (e.g., generated and presented) according to crop, geographic region, or both and can permit the user to monitor the progress of one or more fields of interest (e.g., their fields). Additionally, approximately 25 days after planting of a crop on a field, an embodiment can provide a simulated productivity index for the field, which can provide an estimate of the end of season yield based on the biomass development in the field (e.g., as represented by a crop growth curve generated for the field in accordance with an embodiment described herein).

As used herein, a machine learning (ML) model can comprise any predictive model that is generated based on (or that is trained on) training data. Once generated/trained, a machine learning model can receive one or more inputs (e.g., one or more features) and generate an output for the inputs based on the model's training. Different types of machine learning models can include, without limitation, ones trained using supervised learning, unsupervised learning, reinforcement learning, or deep learning (e.g., complex neural networks).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example crop field monitoring and intelligence system 100. The crop field monitoring and intelligence system 100 can include multiple instances of a client device 102, each of which hosts a number of applications, including an application 104. The application 104 can be communicatively coupled to a server system 106 and third-party servers 108 via a network 110 (e.g., the Internet). The application 104 can also communicate with another locally-hosted application using Applications Program Interfaces (APIs). Depending on the embodiment, the application 104 can represent one of several applications operating on the client device 102, such as a web browser, a desktop software application, or a mobile device software application.

The server system 106 provides server-side functionality via the network 110 to the application 104. While certain functions of the crop field monitoring and intelligence system 100 are described herein as being performed by either the application 104 or by the server system 106, the location of certain functionality either within the application 104 or the server system 106 may be a design choice. For example, it may be technically preferable to initially deploy certain technology and functionality within the server system 106 but to later migrate this technology and functionality to the application 104 where a client device 102 has sufficient processing capacity.

The server system 106 supports various services and operations that are provided to the application 104. Such operations include transmitting data to, receiving data from, and processing data generated by the application 104. Data exchanges within the crop field monitoring and intelligence system 100 are invoked and controlled through functions available via user interfaces (UIs) of the application 104.

Turning now specifically to the server system 106, an Application Program interface (API) server 114 is coupled to, and provides a programmatic interface to, application servers 112. The application servers 112 are communicatively coupled to a database server 118, which facilitates access to a database 124 that stores data processed by the application servers 112. Similarly, a web server 126 is coupled to the application servers 112, and provides web-based interfaces to the application servers 112. To this end, the web server 126 processes incoming network requests over the Hypertext Transfer Protocol (HTTP) and several other related protocols.

The Application Program Interface (API) server 114 receives and transmits data (e.g., commands and payloads) between the client device 102 and the application servers 112. Specifically, the Application Program Interface (API) server 114 provides a set of interfaces (e.g., routines and protocols) that can be called or queried by the application 104 in order to invoke functionality of the application servers 112. The Application Program Interface (API) server 114 exposes various functions supported by the application servers 112, including account registration, login functionality, the sending of data (e.g., farm field information, user inputs, or media files capturing observations) from the application 104 to a crop growth curve system 116, a crop market intelligence system 120, or a crop disease risk system 122, and for possible access by another application (e.g., on another client device).

The application servers 112 host a number of server applications and subsystems, including for example the crop growth curve system 116, the crop market intelligence system 120, and the crop disease risk system 122. The crop growth curve system 116 can implement processing technologies and functions relating to generation of a crop growth curve for one or more fields of interest, generation of a crop growth band (e.g., for comparison against a crop growth curve of a specific field of interest), or generation of a simulated field performance index generation for a field of interest. The crop market intelligence system 120 can implement processing technologies and functions relating to generation of market intelligence for a geographic region. The crop disease risk system 122 can implement processing technologies and functions relating to performing crop disease risk analysis for one or more fields of interest. Other processor and memory intensive processing of data may also be performed server-side by the crop growth curve system 116, the crop market intelligence system 120, or the crop disease risk system 122, in view of the hardware requirements for such processing. The crop growth curve system 116, the crop market intelligence system 120, or the crop disease risk system 122 maintains and accesses satellite remote sensing data, farm field data, meteorological data, and model data (e.g., describing one or more machine learning models) within the database 124. Use of one or more of the crop growth curve system 116, the crop market intelligence system 120, and the crop disease risk system 122 can provide a user with a tool that generates information (e.g., daily information) to monitor crop on one or more fields of interest selected by the user (e.g., information about growth of the crop compared to a high performing field growing the same crop in the geographic region). The information provided by the user can be actionable, and enable the user to rapidly crop issues/problems as they occur throughout a growing season.

For some embodiments, the crop growth curve system 116 includes one or more of the following features or modules for use by a user: registration and authentication, which can facilitate user registration and authentication using a cell phone number (e.g., via SMS) or via verified email; user account hierarchy, which can comprise an administrative tool for adding user accounts to platforms and providing read, write permissions on the platform; weather intelligence, which can provide overlay precipitation observations on a crop growth curve, can provide weather forecast for today and in the future; field outlines, which enables field outlines (or boundaries) to be illustrated on a geographic map, where the field outlines may be either provided by the user directly, imported from a tool that facilitates digital mapping (e.g., FIELDFOCUS or GOOGLE EARTH), imported from a government database (e.g., Cadastral database) that can show the extent, value or ownership of land, or automatically determined using a machine learning approach; field passport information, which can provide a customizable dashboard of field attributes gathered from a user after field digitization, where the information can include crop variety, planting date, agronomist of interest, and the like; field comparison time series, which can generate a time series of vegetation index values to compare a current field for a current year, a previous year, or both to an optimal growth band; field productivity index, which can provide a current year yield estimate based on biomass-yield relationships; optimal crop growth band, which can estimate an in-season variation of both cropped area and production, and can enable selection of different growth bands according to eco-region or crop type (e.g., maize, soy, etc.); field ranking and alerts, which can generate colorized ranking of fields based on whether they align with/fall within an optimal growth band, or misalign with/fall below the optimal growth band, and which can generate automated reports or in-application alerts; data extraction for user drawn shapes, which can generate a report based on data extraction of grid information by user drawn shapes; export function of formatted report, which can generate a customized and formatted report for user download; and field-sharing, link, which can provide a portable link (e.g., Universal Resource Link (URL)) that includes field specific information designed and that can be shared with another individual (e.g., via emailing or social media). With respect to user management, a platform of an embodiment can provide a user hierarchy to allow a client to provide access to the platform to one or more users within their organization. Such a hierarchy can allow a single user to have administrator rights to add, approve, and remove usernames for individuals in the organization. Depending on the embodiment, at least three layers of users can be provided: a user who can only see a single set of fields (e.g., user who is a farm worker, a farmer, or an individual agronomist); a user who is associated with multiple sets of fields (e.g., user who is a manager, a farm worker, or a farmer); and a user who is in charge of all accounts for an organization (e.g., user who is an administrator). According to some embodiments, the crop growth curve system 116 performs (or causes performance) of one or more operations described with respect to a method 200 described with respect to FIG. 2.

For some embodiments, the crop market intelligence system 120 includes one or more of the following features or modules for use by a user: individual crop type identification, which can enable crop type (e.g., maize, soy, wheat, sunflower, sugarcane) identification (e.g., by country), and can identify crop rotation; export function of cropped area, which can export cropped area reports; two map comparison, which can provide a draggable slider e.g., on a graphical user interface) to quickly compare two cropped area images from different time periods; distance calculator, which can draw line on a geographic map to report distance (e.g., in meters); in-season crop identification, which can generate an in-season crop map for different types of crop, such as maize, wheat or soybean; client-specific points of interest, which can facilitate upload of a file with one or more locations and one or more labels, and enable customizable view access; soil type, which can generate one or more grids of static soil type from publicly available data sources; soil acidity, which can generate one or more grids of static soil pH from publicly available data sources; precipitation, which can generate one or more grids of historical precipitation (e.g., 5-day, 10-day, monthly, etc.); elevation, which can generate a map of elevation data (e.g., 30 m elevation data); export function of formatted report, which can generate a customized and formatted report for user download; and data extraction for user drawn shapes, which can generate a report based on data extraction of grid information by user drawn shapes. According to some embodiments, the crop market intelligence system 120 performs (or causes performance) of one or more operations described with respect to a method 300 described with respect to FIG. 3.

The crop market intelligence system 120 can generate cropped area maps (e.g., in the regional market intelligence (RMI) tool section) that are derived from a decision tree classification system that produces highly accurate maps with training data. This system can handle small field sizes and complex agro-ecosystems, and can be used to estimate total cropped area in a geographic region for strategic business decisions. The crop market intelligence system 120 can provide aggregated and easy-to-use field-level data by transforming ground truth data into gridded information output, which can improve the effectiveness of businesses and policy interventions in the agriculture value chain. The annual cultivated area maps provided by the crop market intelligence system 120 can permit businesses to identify regions with high densities of cultivated fields and agricultural activities, even in countries with very poor publicly available agricultural statistics. High quality maps provided by the crop market intelligence system 120 can, for example, allow companies selling hybrid seeds and other inputs to ensure that sufficient supply of seeds is available for purchase. Additionally, these maps can also ensure that there are appropriate sales staff and agronomist expertise available to help farmers use them effectively. The crop market intelligence system 120 can provide regional information that is comparable across space and time for each crop, which in turn can allow for the commitment of investment and commercial effort in distributing locally appropriate agricultural inputs. The crop market intelligence system 120 can provide interpretation and presentation of the maps to support decision making. According to some embodiments, the crop market intelligence system 120 uses a hybrid approach towards in-season field monitoring that combines machine learning models along with a process-based crop growth model that can be configured for a wide range of crop rotations and other vegetative systems, tillage systems, and other management strategies. By using the hybrid approach, the crop market intelligence system 120 can present cropped area maps and farmer data in both rich and data deficient environments across the various geographies.

For some embodiments, the crop disease risk system 122 includes one or more of the following features or modules for use by a user: disease pressure map, which can generate gridded information about potential disease pressure for a particular crop-disease pair across a geographic region or field; daily disease pressure time series, which can provide analysis or an estimation of crop disease stress for one or more specific geographic locations; calibration points, which can generate one or more points on a geographic map that represents one or more ground observations used to calibrate a disease model; field passport information, which can generate a customizable dashboard of field attributes gathered from a user after field digitization, which can include crop variety, planting date, and the like; field observations for disease model (using beacon data), which can enable input (e.g., ingestion) of agronomist expert observations, such as photo evidence and tracking systems; user account hierarchy, which can provide one or more administrative tools that enable adding accounts to the platform and providing read, write permissions on the platform; data extraction for user drawn shapes, which can generate a report based on data extraction of grid information by user drawn shapes; alerts, which can generate an alert for early warning of disease or one or more extreme growing conditions; user messaging, which can facilitate messaging via an in-application system, or third party messaging system; lead generation panel, which can use client-provided farm location to segment fields/users by disease threat; messaging box, which can facilitate spatial selection of an exportable user list with modifiable columns and automated messages; and export function of formatted report, which can generate a customized and formatted report for user download. According to some embodiments, the crop disease risk system 122 performs (or causes performance) of one or more operations described with respect to a method 400 described with respect to FIG. 4.

Figure 2:
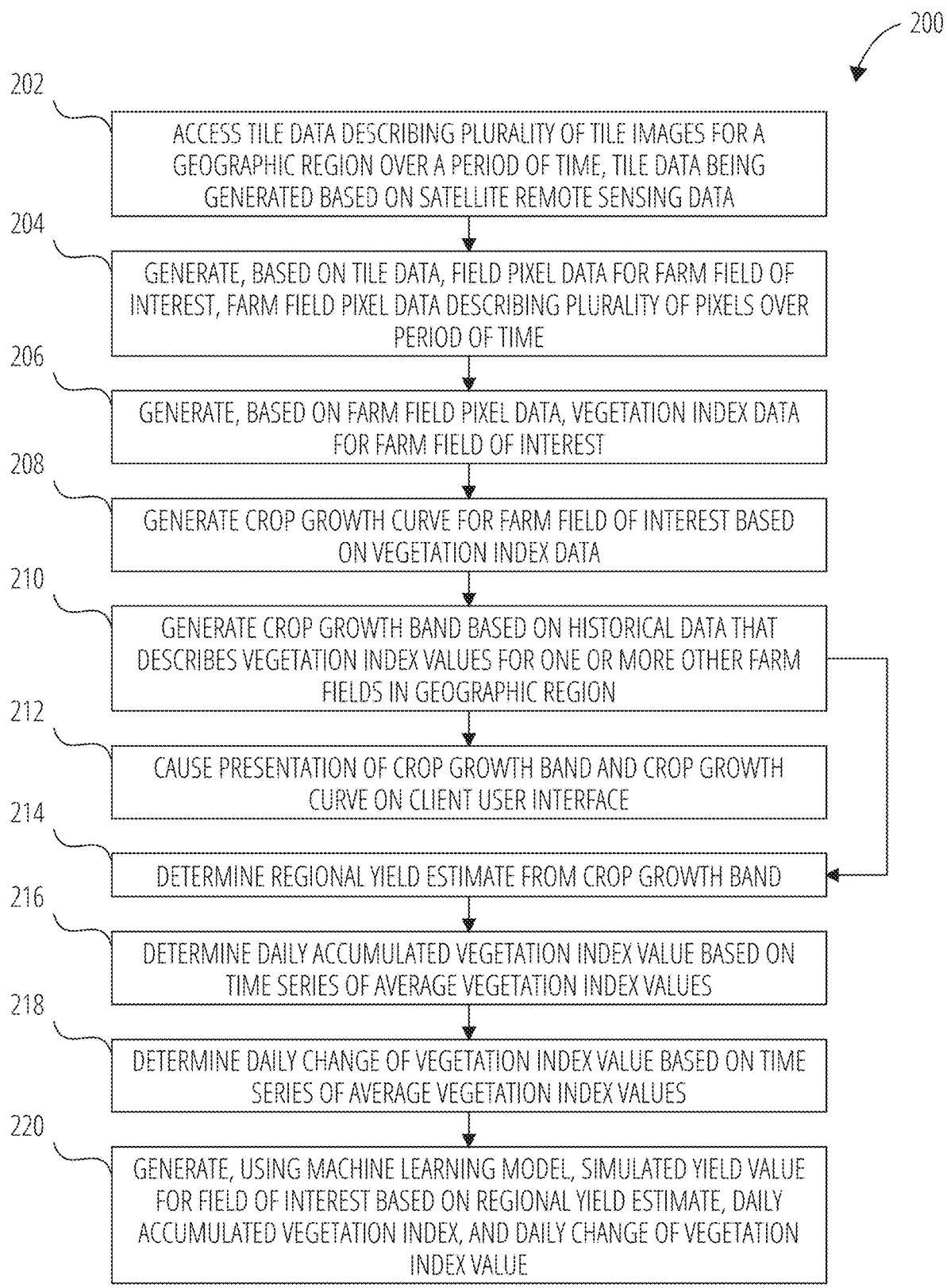
FIG. 2 is a flowchart illustrating an example method for generation of crop growth curve for a farm field, according to various embodiments of the present disclosure.

FIG. 2 is a flowchart illustrating an example method 200 for generation of crop growth curve for a farm field, according to various embodiments of the present disclosure. It will be understood that example methods described herein may be performed by a machine in accordance with some embodiments. For example, the method 200 can be performed by the crop growth curve system 116 described with respect to FIG. 1, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of the method 200 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, at operation 202, a hardware processor accesses tile data describing a plurality of tile images for a geographic region over a period of time, where the tile data is generated based on satellite remote sensing data. For some embodiments, the tile data is generated based on the satellite remote sensing data by preprocessing the satellite remote sensing data. For example, the satellite remote sensing data can comprise European Space Agency (ESA) Sentinel 2 Level IC tile data over a period of time (e.g., over the past 2 years) for the geographic region. Specifically, the ESA Sentinel 2 tile data (e.g., without atmospheric correction) can be obtained (e.g., downloaded) from the ESA, and the obtained ESA Sentinel 2 tile data can be filtered by cloud level and number of fields of interest (e.g., for all users) in each tile image. A standard cloud mask data can be obtained (e.g., downloaded) from the ESA, and can use the cloud mask (described by the data) as a degree of cloudiness. The filtered Sentinel 2 tile data can represent a subset of the Sentinel 2 tile data and cloud mask data. The subset of the Sentinel 2 tile data and cloud mask data can be entered into a database, which generates pixel-level entries for each farm field of interest, ordered by time. If a tile image is absent on a specific day (e.g., due to the satellite overpass schedule), the corresponding bands can be filled with zeros, and the cloud masks can be filled with −1. The resulting pixel-level data can be used for generating a crop growth curve.

At operation 204, the hardware processor generates, based on the tile data (accessed at operation 202), farm field pixel data for a farm field of interest, where the farm field pixel data describes a plurality of pixels for the farm field of interest over the period of time.

At operation 206, the hardware processor generates, based on the farm field pixel data (generated at operation 204), vegetation index data for the farm field of interest. According to some embodiments, operation 206 comprises performing the following for each individual pixel in the plurality of pixels: generating an initial time series of vegetation index values for the individual pixel over the period of time; and generating a reconstructed time series of vegetation index values for the individual pixel, over the period of time by using a machine learning model to generate a predicted vegetation index value for each vegetation index value in the initial time series of vegetation index values. For some embodiments, the reconstructed time series of vegetation index values represent the initial time series of vegetation index values after gap-filling (e.g., by reconstructing values to fill in data gaps caused by caused by smoke, clouds, and irregular satellite overpass times), correction, or both, have been applied to the initial time series of vegetation index values by the machine learning model In this way, the reconstruction of vegetation index values can effectively result in vegetation index values being interpolated at daily time step at the pixel level.

For some embodiments, the machine learning model (used by operation 206) as trained is configured to receive (e.g., as a feature) an input vegetation index value and generate (as output) an output vegetation index value that represents a correction of the input vegetation index value or a replacement of the input vegetation index value. For example, during operation 206, when the machine learning model is being used in prediction mode, the machine learning model can accept an array of vegetation index values as input and can generate (as output) an array of the same dimension with the reconstructed time series of vegetation index values. To discard invalid pixels due to strong cloudiness or lack of data, the input array of vegetation values can be multiplied by an inverted cloud mask derived from band data before being provided to the machine learning model as input, thereby causing corresponding pixels to be assigned the value of zero and increasing the machine learning model's robustness to rapid vegetation declines (e.g., usually corresponding to cloud, smoke, or haze-affected periods).

Depending on the embodiment, the machine learning model (used by operation 206) comprises convolutional autoencoder model (or some other a neural network model) that is configured (e.g., trained) to reconstruct vegetation index values of all pixels (e.g., of a tile image) of each field. Each individual pixel of a tile image can comprise its own machine learning model for correction, gap filling, or both, where the machine learning model is trained based on the individual pixel's unique cloud history. For instance, the biomass history of one pixel for one year with an interval of one day can be obtained as a sample (e.g., a sequence of length 365 days). The convolution in each layer of the machine learning model can be taken along a time axis. Subsequently, the machine learning model can predict a next day in a time series (e.g., this is needed since ESA the Sentinel 2A and 2B sensor data only go over each point on the Earth once every 3-5 days and there are clouds, which results in gaps of satellite remote sensing data). Generally, the ESA Sentinel 2A and 2B satellite sensor passes over each location on Earth every 3 to 5 days, depending on the latitude of the location. Additionally, agricultural areas are usually affected by clouds, smog, smoke, and other atmospheric interference that reduces the number of days with clear observations of the ground. For some embodiments, the machine learning model is used to predict a corrected and gap-filled vegetation index value for today's date if no valid data is available—the predicted corrected/gap-filled vegetation index value can be corrected the next time actual data is available with valid vegetation index values (e.g., with a value falling within a range between 0 and 100).

Additionally, for some embodiments, a Mean Square Error (MSE) process is used to generate a learning metric for the machine learning model. For instance, the MSE process can compare a current pixel-level time series to a previous years' average field time series. An output layer of the machine learning model can comprise a sigmoid as an activation function, which can ensure that the predicted vegetation index value is in a range from 0 to 100. This can also make it possible to use a binary cross-entropy instead of MSE, but where the training results do not exceed MSE. The labels can comprise vegetation index data observations of a pixel that fall between 0 and 100 and may not be significantly different than expected with the previous years' average vegetation index for the date of observation. The target labels (e.g., 'good data' or 'missing data') of the vegetation index values can be obtained by smoothing the input values to the daily time step with the Savitsky-Golay filter (Savitsky and Golay, 1964), which can ensure the machine learning model's robustness to significant gaps in the data (e.g., which may reach several weeks). Pixels that have very low vegetation index values or are missing (e.g., flagged with −1) can be labeled as bad data, as low vegetation data often relates to clouds, smoke, haze or cloud shadows obscuring the vegetation signal. A dropout can also be applied at initial stages of training (and turned off at the last stages of training) to increase the machine learning model's robustness to missing data by increasing the machine learning model's stability and generalizability. The dropout can be turned off at the last stages of training since the dropout can intensely smooth the reconstructed time series of vegetation index values.

For various embodiments, during operation 206, the time series of vegetation index values are calculated for each pixel of a field using relevant satellite remote sensing data (e.g., ESA Sentinel sensor spectral bands of red, near-infrared, and green) that are sensitive to plant biomass and vigor. Generation of a single vegetation index value can comprise computing a standard Normalized Difference Vegetation Index (NDVI) value, truncating that value from 0 to 1 by removing all negative values and multiplying by a predetermined factor, such as 100. A single vegetation index value can comprise a single number that quantifies vegetation biomass and plant vigor, a time series of vegetation index values for a single pixel (e.g., in a tile image from the satellite remote sensing data) can quantify biomass and plant vigor of the vegetation represented by the pixel over a period of time. A single vegetation index value can range from 0 to 100 for each pixel in a tile image, which can help identify geographical areas of varying levels of plant biomass/vigor. A higher value indicates high biomass/high vigor.

At operation 208, the hardware processor generates a crop growth curve for the farm field of interest based on the vegetation index data (generated at operation 206). For some embodiments, operation 208 comprises: generating a time series of average vegetation index values by averaging together all vegetation index values, for each time point in a range of time within the period of time, from all of the reconstructed time series of vegetation index values; and generating the crop growth curve based on the time series of average vegetation index values. In doing so, some embodiments can take, from a gap-filled and reconstructed time series of vegetation index values, all the daily pixel observations for each field and average them to create the time series for each field to eventually generate a crop growth curve (e.g., optimal growth curve) for the farm field of interest. Because the reconstruction and gap filling is at the pixel level, various embodiments can avoid having to remove any pixels from each day (e.g., as being missing or cloudy). As described herein, the generated crop growth curve can provide a daily update summary of how well a farm field is growing throughout a season and can be compared to an crop growth band (e.g., optimal crop curve band) generated at operation 210. The crop growth curve can permit a user to monitor progress of crop development as the crop canopy develops on the field of interest. Using crop growth curves, each field for the current or previous years can be compared to a crop growth band of the best fields of the same crop in the geographic region. The crop growth curve can link an understanding of a meaning of crop biomass to business processes and actionable agronomic response when the crop growth curve drops below a particular level. The crop growth curve can provide an easyto-interpret transformation of phenology models and can relate the above-ground biomass information to yield for immediate support of improved decision making over several (e.g., thousands) of farm fields.

At operation 210, the hardware processor generates a crop growth band based on historical data that describes vegetation index values for one or more other farm fields in the geographic region. Operation 210 can comprise selecting the one or more farm fields from a plurality of farm fields in the geographic region (e.g., the same geographic region as the farm field of interest). A subset of farm fields can be selected from the one or more farm fields, where each farm field in the subset of farm fields has a yield that is higher than a lower percentile threshold (e.g., 5th percentile) and lower than a higher percentile threshold (e.g., 5th percentile). A median vegetation index curve can be generated for those fields, in the subset of farm fields, that have a yield that is higher than a upper percentile threshold (e.g., 25th percentile). Eventually, the crop growth band can be generated based on the median vegetation index curve. By operation 210, the gap-tilled and reconstructed daily vegetation index values (generated by operation 206) for the best performing farm fields in the geographic region (which have the highest yield in the previous year) can be combined into one crop growth band that represents those farm fields' vegetative progression from emergence through harvest. This crop growth band, for example, can be formed by removing a lower and upper 5 percentile of farm fields of the geographic region by yield, and then calculating the crop growth band as a median vegetation index curve for an upper 25 percentile (e.g., +/−1 standard error). Additionally, using the crop growth curve for the farm field of interest, accumulated over a season along with the current value, operation 210 can estimate a total yield through a regression model. The regression model is estimated using fields that have close proximity to each other and to the farm field of interest, thereby removing biases in overall productivity (e.g., due to agroclimatic zone and soil type).

From operation 210, at operation 212, the hardware processor causes presentation of the crop growth band (generated at operation 210) and the crop growth curve (generated at operation 208) on a client user interface (e.g., graphical user interface). For some embodiments, the crop growth band and the crop growth curve are presented (on the client user interface) relative to each other for comparison. Examples of crop growth curves and crop growth bands are illustrated with respect to FIG. 11, FIG. 12, FIG. 13, and FIG. 21.

From operation 210, at operation 214, the hardware processor determines determining a regional yield estimate from the crop growth band (generated at operation 210). At operation 216, the hardware processor determines a daily accumulated vegetation index value based on the time series of average vegetation index values (generated at operation 208). Additionally, at operation 218, the hardware processor determines a daily change of vegetation index value based on the time series of average vegetation index values (generated at operation 208).

At operation 220, the hardware processor generates a simulated yield value for the field of interest based on the regional yield estimate (determined at operation 214), the daily accumulated vegetation index (determined at operation 216), and the daily change of vegetation index value (determined at operation 218). By operation 220, various embodiments described herein can provide a user a simulated yield value (also referred to herein as a simulated field performance index value or simulated productivity index value) for the farm field of interest in tons per hectare (t/ha) after a certain number of days after planting a crop (e.g., 45 days). The simulated yield value can be provided across all fields being monitored, thereby providing the total potential production on a farm, from which the likelihood of attaining a profit, can be estimated. The simulated yield value takes a yield measured at key, high yield farm fields from the previous year in the same geographic region (e.g., aeroecological zone) as the farm field of interest. An agroecological zone is a geographical region exhibiting similar climatic conditions, such as total rainfall and temperature regimes that determine their ability to support rainfed agriculture. High performing fields can be defined as having above productivity threshold for certain crops (e.g., 4 t/ha for soybean and 6 t/ha for maize). Operation 220 can compare the progression of the crop growth curve (of the farm field of interest) to the crop growth band for the same time since planting, and generate a simulated yield value by estimating total yield through a machine learning model. The machine learning model can use (as input features) regional yield estimate from the fields used to generate the crop growth band as the dependent variable and the daily accumulated vegetation index values, along with the daily change of the vegetation index values as independent variables. By using the simulated yield value, a user can immediately determine the health of the crop and relate their crop canopy health to overall yield. More regarding simulated yield value is discussed with respect to FIG. 6.

Figure 3:
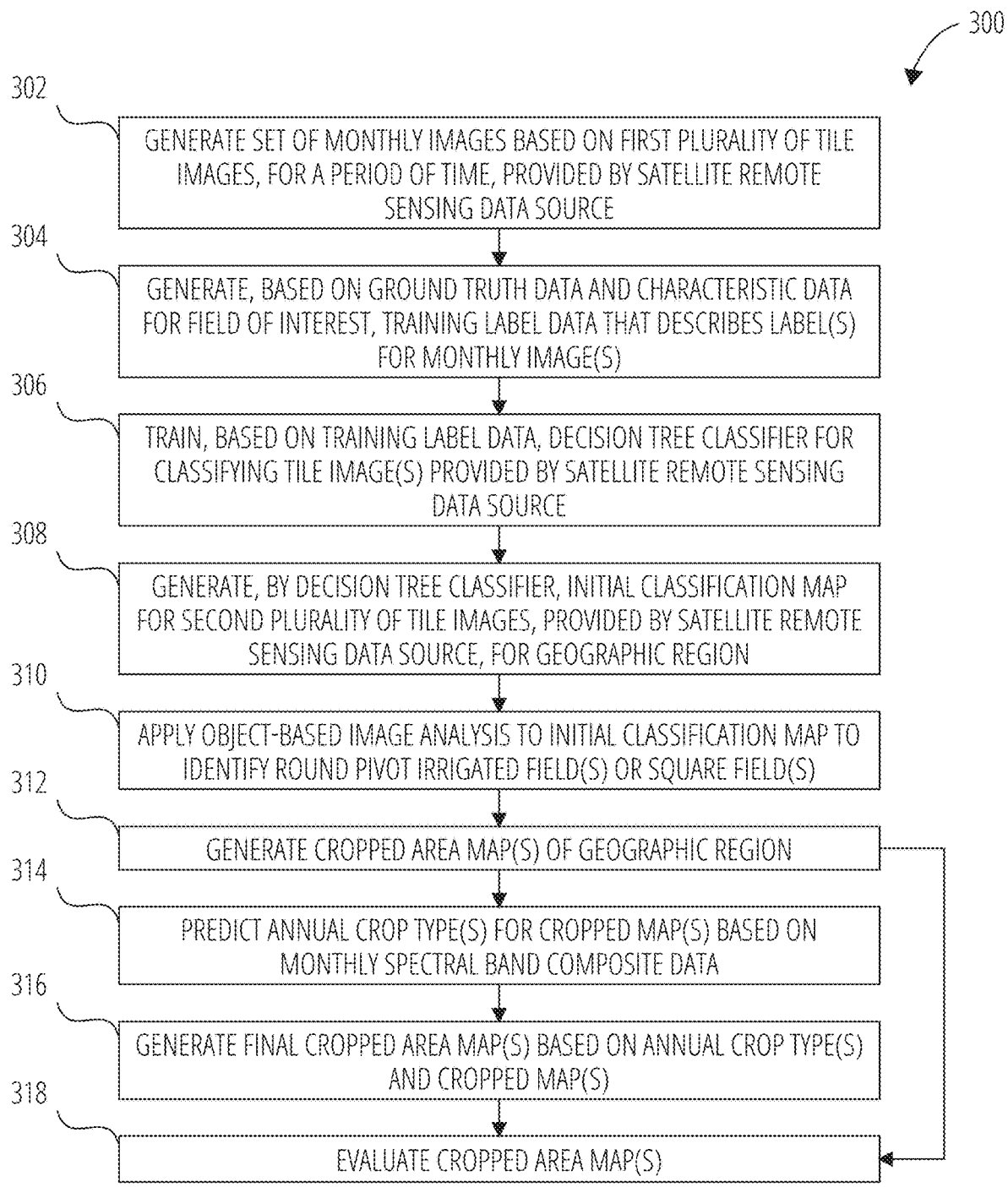
FIG. 3 is a flowchart illustrating an example method for generation of market intelligence for a geographic region, according to various embodiments of the present disclosure.

FIG. 3 is a flowchart illustrating an example method 300 for generation of market intelligence for a geographic region, according to various embodiments of the present disclosure. It will be understood that example methods described herein may be performed by a machine in accordance with some embodiments. For example, the method 300 can be performed by the crop market intelligence system 120 described with respect to FIG. 1, or individual components thereof. An operation of various methods described herein may be performed by one or more hardware processors of a computing device, which may be part of a computing system based on a cloud architecture. Example methods described herein may also be implemented in the form of executable instructions stored on a machine-readable medium or in the form of electronic circuitry. For instance, the operations of the method 300 may be represented by executable instructions that, when executed by a processor of a computing device, cause the computing device to perform the method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 3, at operation 302, a hardware processor generates a set of monthly images based on first plurality of tile images, for a period of time, provided by satellite remote sensing data source. For some embodiments, operation 302 comprises performing the following for each month in the period of time: determining a maximum pixel value of all images, within the first plurality of tile images, for all non-cloudy time periods during the month; and generating a monthly image for the month by setting each pixel of the monthly image to the maximum pixel value. Alternatively, for some embodiments, operation 302 comprises performing the following for each month in the period of time: determining an average pixel value of all images, within the first plurality of tile images, for all time periods during the month; and generating a monthly image for the month by setting each pixel of the monthly image to the maximum pixel value. For example, satellite remote sensing data from Sentinel 2A and 2B can be mosaiced into monthly images by taking the maximum value of the vegetation imagery for all non-cloudy time periods and filling each pixel with that value. For instance, if there were six images in March over a country of interest, a single image can be generated for the month of March using the maximum value of the vegetation index for all six images for every pixel. Additionally, the average of each Sentinel 2A and 2B band can be averaged over all time periods in each month, generating one image per month, with data for each pixel with at least one observation across the region of interest. During operation 302, satellite remote sensing data from multiple different platforms can be calibrated (or radiometrically aligned so that the vegetation from one sensor is equivalent to that produced by another), can be cloud screened (e.g., clouds are removed and replaced with 'no data' flags), and can placed into a monthly time series for different crop sensitive bands (e.g., 4 different bands) ready for analysis.

At operation 304, the hardware processor generates training label data based on ground truth data and characteristic data for field of interest, where the training label data describes one or more labels for the set of monthly images. For example, ground truth data and the characteristic data can be inputted into a labeling tool, and an human labeling can use them to generate training labels (e.g., with vegetation index values, true and false color satellite imagery, weather, and land cover data, etc.). The ground truth data can be generated from data for multiple farm fields, as provided by other users (in connection with their respective farm fields of interests) or from third party partners. The ground truth data can include, without limitation, crop type, year, and latitude/longitude: points. The ground truth data can educate a human labeling team with crop types look like in satellite remote sensing time series data. The human labeling team can use, for example, rainfall and vegetation time series, overlain on very high resolution Earth imagery, to generate the training labels data of fields which have similar characteristics as to the field of interests (e.g., they have similar green up and brown-down timing, similar reflectance in the red, green and near infrared, they respond to rainfall data in a similar way, etc.). The training label data can include various labels, including crop type (e.g., maize, soybean, sunflower, etc.) or not-cropped, irrigation (e.g., yes/no), management (e.g., rows or no rows visible), and other land cover types (e.g., water, urban, forest). By generating (e.g., thousands of) training labels at operation 304 using an expert human labeling team (e.g., in geographic regions where an unsupervised classification does poorly), various embodiments can exploit the expert knowledge of the human labeling team to produce training data for cultivated areas in which an unsupervised classifier struggles to identify a crop of interest.

Eventually, at operation 306, the hardware processor trains decision tree classifier, for classifying one or more tile images provided by satellite remote sensing data source, based on the training label data. In particular, the training label data can be used to parametrize the decision tree classifier for classifying the multi-temporal, multi-spectral Sentinel 2A/B data. Weights can be applied at each point to correct the sampling bias and interpretation bias. A decision tree classifier algorithm can perform binary recursive partitioning to allocate automatically the maximum information carrying feature for the classification, and can discard the remaining features at that transitional stage, which can increase the computational efficiency. Partitioning can involve thresholds that remove land areas with, for example, too low of a vegetation time series (such as urban or water pixels) or too invariant time series (such as forest or shrubs). For example, the training label data can be used to determine 'maize' time series characteristics, and then partition each pixel (e.g., through a gradient boosting technique) into 'crop' and 'non-crop' and then into the crop of interest and other categories.

At operation 308, the hardware processor generates an initial classification map for a second plurality of tile images by the decision tree classifier, where the second plurality of tile image for the geographic region are provided by satellite remote sensing data source. For instance, the decision tree classifier can be run over the previous 18-months of multi-spectral, multi-season Sentinel 2 observations for a geographic region to produce one or more cropped area maps (e.g., at 10 m resolution) for the geographic region. By using 18-month of data, increasing the number of sensors being used (e.g., adding Landsat observations to those from Sentinel), and extending the decision tree classifier to use additional vegetation parameters (e.g., using the Enhanced Vegetation index parameter which has a blue band), operation 308 can deal with cloudy regions (to generate map cropped area) even when it is cloudy. A Minimum Mapping Unit (MMU), which can be the smallest size that determines whether a feature is captured from a remotely sensed image, can be applied to a tile image to remove scattered, noisy pixels. The decision tree classifier can be configured to receive features that include derivatives of the previous years' time series, such as the growth rate of the vegetation from planting to peak greenness, the rate of senescence of the vegetation, and the length of the growing period. The decision tree classifier can use a set of linear discriminant functions that are applied at each test node, where a binary decision is made for splitting a complex decision into several simpler decisions to separate either one class or some of the classes from the remaining classes. For instance, the decision tree classifier can use features to identify forests, which have a low green-up and senescence parameter when compared to a cereal crop such as maize. The decision tree classifier can use third-party, open source global classification to accelerate the filtering, by using the invariant water, forest and urban classes from the prior time periods represented in the third party global classification. This can reduce the number of pixels across the geographic region of interest to only those that might be crop areas compared to other classes where the probability is lower (e.g., urban or forest).

The decision tree classifier can generate a confidence metric to indicate spatial distribution of classification uncertainty. This metric can allow a user to know how likely it is that the total amount of cropped area over a region captures the actual cropped area on the ground. The confidence metric can be derived by taking the ground truth data not used in development of the decision tree classifier, and by determining how accurate the map is in capturing the known cultivated fields in the year of interest. The decision tree classifier can have multiple accuracy assessments, which allow a user to know how much effort they will need to put into their ground truth data. For example, a level 0 model (e.g., decision tree classifier) can comprise a global model with no calibration and can have an example accuracy of 55%; a level 1 model can comprise a model from a nearby region or country, can be used for identification of general patters and trends, and can have an example accuracy of 60-80%; a level 2 model can comprise a country-specific model, can be used for region scale decision making process, and can have an example accuracy of 80-90%; and a level 3 model can comprise a business/science quality data, can be used for identification of general patters and trends, and can have an example accuracy of 90+%. To achieve the desired accuracy, a level 2 model can be developed based on hand interpreted points, while a level 3 model can be developed using in-season field photos or field level outlines. With sufficient ground truth data points, data for a level 3 model can be generated within 2 weeks for example. Depending on the geography and our previous experience with that crop/location, the decision tree classifier can operate at or near-real time with ground truth data points to calibrate.

If a user needs an extremely accurate data because of large financial investments, then the user may use a level 3 model generated based on hundreds of data points in a region, especially if the decision tree classifier has never been calibrated for a specific crop (e.g., cotton or cassava). If the user wants to know in general how much crop is being cultivated in a region where they do not have anyone on the ground and believe accuracy is not the most important aspect of the data, then using a decision tree classifier that is a Level 1 model can be sufficient for decision making. For instance, for maize cultivation in the Katanga region of the Democratic Republic of Congo, ground truth data points from Zambia can be used to generate the training labels in the region that were used to generate the decision tree classifier.

At operation 310, the hardware processor applies an object-based image analysis to initial classification map to identify one or more round pivot irrigated fields or one or more square fields. By observing the time series and rainfall data (e.g., at operation 310), the method 300 can identify regions with higher than expected vegetation data given rainfall in the area and can identify irrigation. Eventually, this assists in generating cropped area maps that separate commercial agriculture (e.g., both irrigated and rainfed) from small-scale, less input intensive farm fields of the same crop.

At operation 312, the hardware processor generates one or more cropped area maps of geographic region based on the initial classification map. At operation 314, the hardware processor predicts one or more annual crop types for the one or more cropped maps based on monthly spectral band composite data. At operation 316, the hardware processor generates one or more final cropped area maps based on the one or more annual crop types and the one or more cropped maps (generated at operation 312). The final cropped area maps generated by 316 can identify cropped areas for each season. At operation 318, the hardware processor evaluates the one or more cropped area maps (generated by operation 312 or by operation 316). For instance, the ground truth data from the geographic region can be used to evaluate the final cropped area classification, and can be used to generate new training data labels in geographic regions with poor accuracy.

Figure 4:
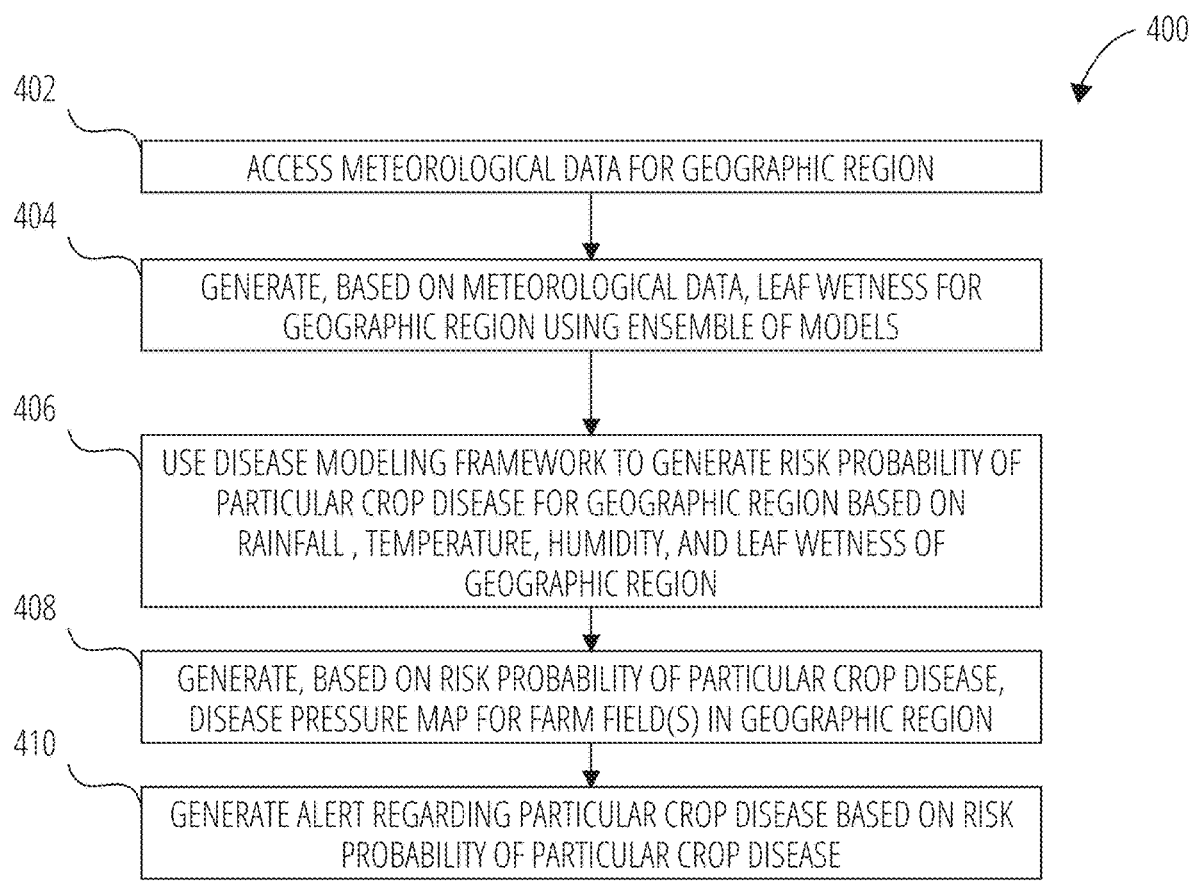
FIG. 4 is a flowchart illustrating an example method for crop disease risk analysis, according to various embodiments of the present disclosure.

FIG. 4 is a flowchart illustrating an example method 400 for crop disease risk analysis, according to various embodiments of the present disclosure. It will be understood that example methods described herein may be performed by a machine in accordance with some embodiments. For example, the method 400 can be performed by the crop disease risk system 122 described with respect to FIG. 1, or individual components thereof. An operation of various methods described herein may be performed by one or more hardware processors of a computing device, which may be part of a computing system based on a cloud architecture. Example methods described herein may also be implemented in the form of executable instructions stored on a machine-readable medium or in the form of electronic circuitry. For instance, the operations of the method 400 may be represented by executable instructions that, when executed by a processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 4, at operation 402, a hardware processor accesses meteorological data for a geographic region. At operation 404, the hardware processor generates, based on the meteorological data, a leaf wetness value for the geographic region using an ensemble of models. For some embodiments, the ensemble of models comprises two or more of: a leaf wetness reference (LWR) model; an Extended Threshold approach model; a classification and regression tree/stepwise linear discriminant (CART/SLD) model; a Fixed Threshold model; a Dew parameterization (DP) model; and a Surface wetness energy balance (SWEB) model. By using a diverse ensemble (e.g., comprising each of an Extended Threshold approach model, a CART/SLD model, a Fixed Threshold model, a DP model, and a SWEB model), the ensemble can cover a diversity of actual crop properties (e.g., crop height, canopy height, leaf area, etc.) in generating the leaf wetness value for at least a portion of a farm field of interest. For example, the DP model can account for crop properties in a single coefficient (e.g., percent net radiation intercepted by the canopy (CNR)). The CART model and the LWR models can use crop properties to compute boundary layer and aerodynamic resistance. Using a diversity of model can enable an embodiment to capture crop fungal stress across agroecosystems (e.g., as diverse as Egyptian tomato growers and cotton farmers in Brazil). Some embodiments use a standard fungal disease prevalence model derived from the literature and driven by leaf wetness.

At operation 406, the hardware processor uses a disease modeling framework to generate a risk probability value of a particular crop disease for the geographic region based on rainfall, temperature, humidity, and the leaf wetness value of the geographic region (generated at operation 404). The disease modeling framework can estimate disease risk at a daily time step, which can permit a user to monitor changes in risk for present day and the days that follow (e.g., the next 7 days). The disease modeling framework can used weather forecast data, including rainfall, temperature, humidity, and calculated leaf wetness value, to provide daily information on changing fungal risk probability. For instance, a user can find their farm field on a map and receive updates and warnings when the risk changes for their farm field. The current risk probability value can be combined with a spraying calendar to assist users understand when they can treat their farm field for fungal outbreaks. The disease modeling framework can focus weather-driven soil-borne diseases, such as early and late blight. For instance, the disease modeling framework can be used to generate a risk probability of late blight, which can disperse from infected plants by wind or splashing raindrops or irrigation water, and can survive dry and cold periods on plant debris in the soil and emerge when weather conditions conducive to growth occur. Generally, daytime temperatures between 60 and 70° F., night temperatures between 50 and 60° F., and relative humidity near 100% are ideal conditions for infection and spread of late blight disease. Widespread anomalous low and high temperature periods driven by a changing climate can increase the intensity and frequency of fungal outbreaks.

At operation 408, the hardware processor generates, based on the risk probability value (generated at operation 406), a disease pressure map for one or more farm fields in the geographic region.

At operation 410, the hardware processor generates an alert regarding the particular crop disease based on the risk probability value of the particular crop disease. Operation 410 can allow a user to receive alerts and agronomic advice that can reduce yield losses due to common fungal crop diseases. Growers who produce high value commercial cash crops (e.g., soybean, maize, tomatoes, potatoes, onions, carrots, and others) are particularly in need of timely information on changing disease conditions, which can be provided by one or more alerts generated by operation 410. Many commercial cash crops are susceptible to fungal and other weather-driven crop diseases when it is cool, moist, and humid at the flowering and harvest growth stage. Given the changing climate, unseasonable damp and cool conditions can occur at unusual times, causing yield loss. The alerts can foster appropriate and rapid response to these threats by disseminating information on impending fungal outbreaks as soon as possible.

Figure 5:
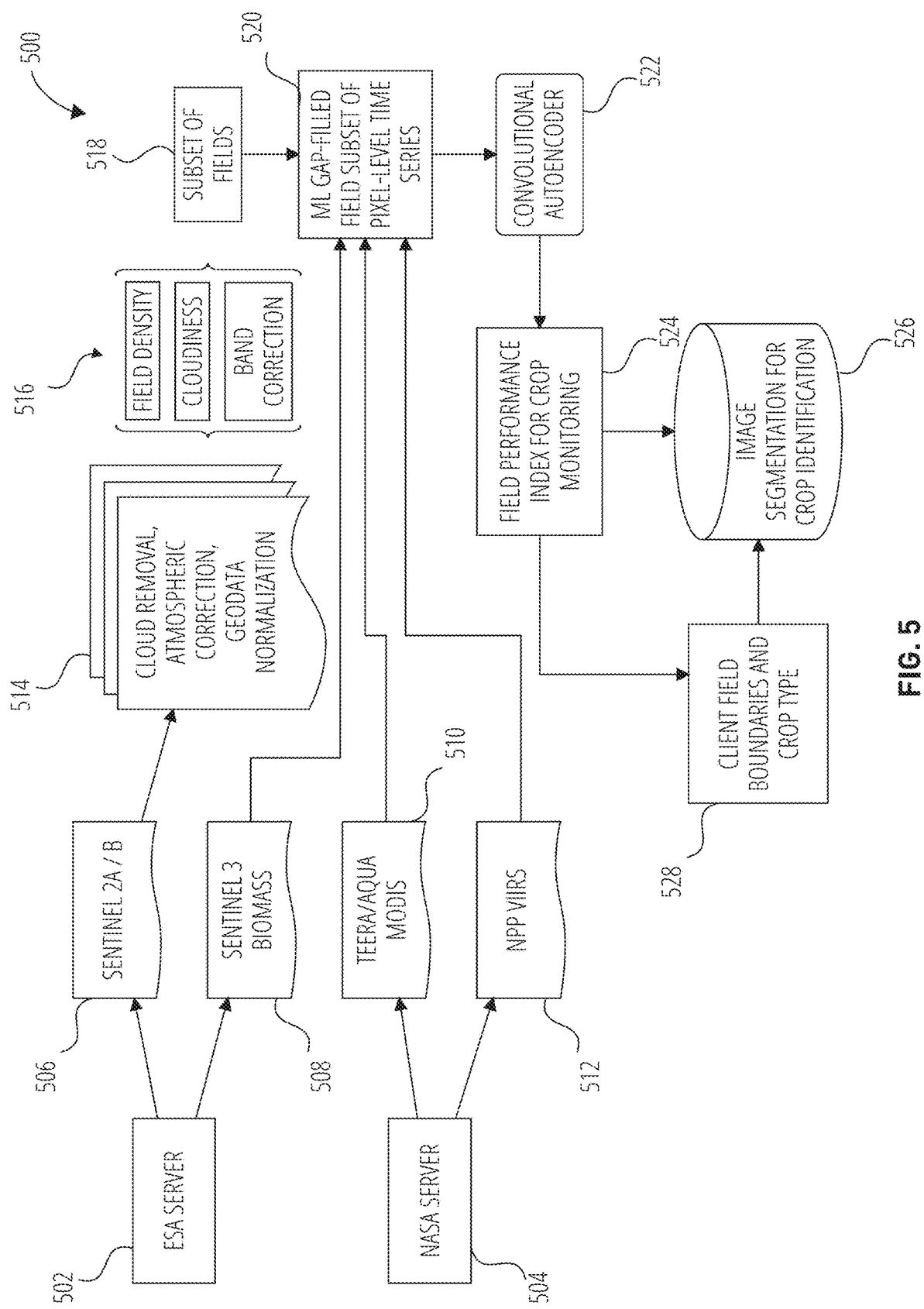
FIG. 5 is a flowchart illustrating an example data flow for an optical remote sensing cloud and gap removal system using machine learning, according to various embodiments of the present disclosure.

FIG. 5 is a flowchart 500 illustrating an example data flow for an optical remote sensing cloud and gap removal system using machine learning, according to various embodiments of the present disclosure. According to some embodiments, the flowchart 500 illustrates implementation of at some part of the method 200 described above with respect to FIG. 2. As shown, an European Space Agency (ESA) server 502 provides satellite remote sensing data (Sentinel 2A/B 506 and Sentinel 3 biomass 508 data), while National Aeronautics and Space Agency (NASA) server 504 provides additional remote sensing data (Teera/Aqua Modis 510 and NPP VIIRS 512 data). Cloud Removal, Atmospheric Correction, Geodata Normalization 514 is performed on the Sentinel 2A/B 506 data. From that data, field density, cloudiness, band correction data 516 data is obtained for a subset of farm fields 518. Using the Sentinel 3 biomass 508, the Teera/Aqua Modis 510, and the NPP VIIRS 512 data, a machine learning model generates an ML gap-filled field subset of pixel-level time series 520 from the field density, cloudiness, band correction data 516 data obtained for the subset of fields 518. A convolutional autoencoder 522 is used to generate a time series of vegetation index time values for each pixel of the field, using relevant Sentinel sensor spectral bands of red, near-infrared and green that are sensitive to plant biomass and vigor. Using the time series of vegetation index time values, a field performance index 524 is generated for monitoring the crop of a farm field of interest. Eventually, client field boundaries and crop type 528 can be identified and image segmentation 526 for crop identification can be performed.

Figure 6:
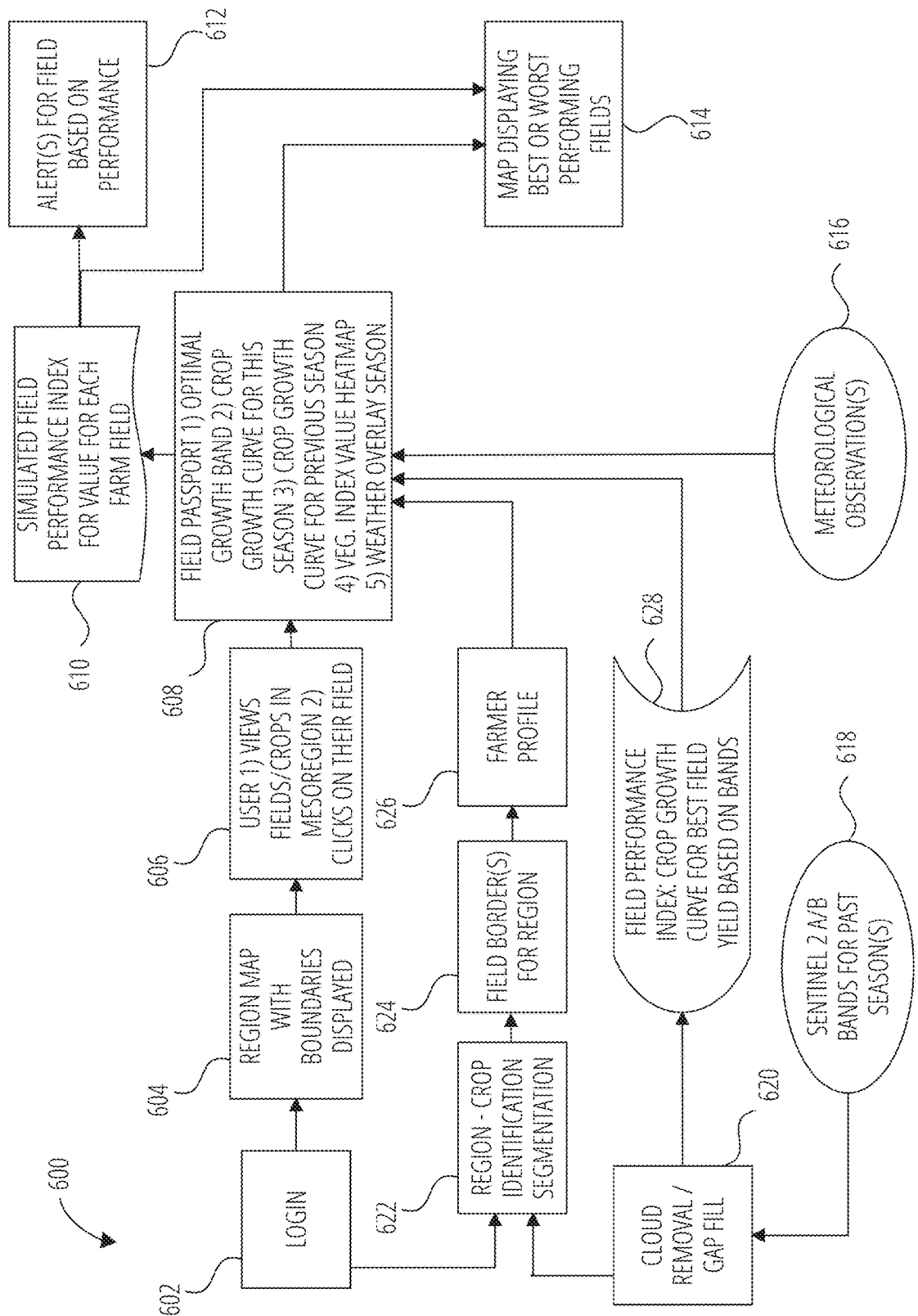
FIG. 6 is a flowchart illustrating an example data flow for generating vegetation index values, a crop growth curve, a crop growth band, and a simulate yield value in connection with a farm field of interest, according to various embodiments of the present disclosure.

FIG. 6 is a flowchart 600 illustrating an example data flow for generating vegetation index values, a crop growth curve, a crop growth band, and a simulate yield value in connection with a farm field of interest, according to various embodiments of the present disclosure. According to some embodiments, the flowchart 600 illustrates implementation of at some part of the method 200 described above with respect to FIG. 2. After a login 602 by a user, a region map 604 with boundaries displayed can be presented to the user and, through the region map 604, the user can view multiple farm fields/crops in a mesoregion and click on (e.g., select) on their farm field of interest (at 606). Based on user view and click 606, a field passport 608 for the selected farm field of interest can be presented to the user, where the field passport 608 provides a variety of various information with respect to the farm field of interest. For example, the field passport 608 can include a crop growth band ('optimal growth band') relating to the farm field of interest, a crop growth curve for the farm field of interest for this season and previous season, a vegetation index value heatmap, and weather overlay season. Examples of the field passport 608 are illustrated with respect to FIG. 23 and FIG. 24. Based on information displayed in the field passport 608, a simulated field performance index value 610 is generated for each farm field and, subsequently, one or more alerts 612 for one or more farm fields can be generated based on performance of the farm field (as indicated by the simulated field performance index values 610). The one or more alerts 612 can include 'emojis' or icons that communicate severity of underperformance or actions the user should take. From the field passport 608, or following generation of the simulated field performance index value 610, a map 614 displaying the best or word performing farm fields can be displayed. The map 614 can provide a user-specific map of fields with a rank from highest performing to lowest performing field.

After the login 602 by the user, a region—crop identification segmentation 622 can be performed, one or more field borders 624 can be identified, and a farmer profile 626 can be generated (e.g., based on the region—crop identification segmentation 622 and the one or more field borders 624). The farmer profile 626 can be used as part of, or in generating, the field passport 608 for the field of interest selected by the user (at 606). To facilitate the region—crop identification segmentation 622, cloud removal and gap-filling can be applied to satellite remote sensing data (e.g., Sentinel 2 A/B Bands 618 data for one or more past seasons) at 620. Additionally, based on the cloud-removed/gap-filled data (generated at 620), a field performance index values 628 can be generated for an optimal growth curve for best field based on bands. The field performance index values 628, one or more meteorological observations 616 (from satellite remove sensing data), or both, can be used as part of, or in generating, the field passport 608 for the field of interest selected by the user (at 606).

Figure 7:
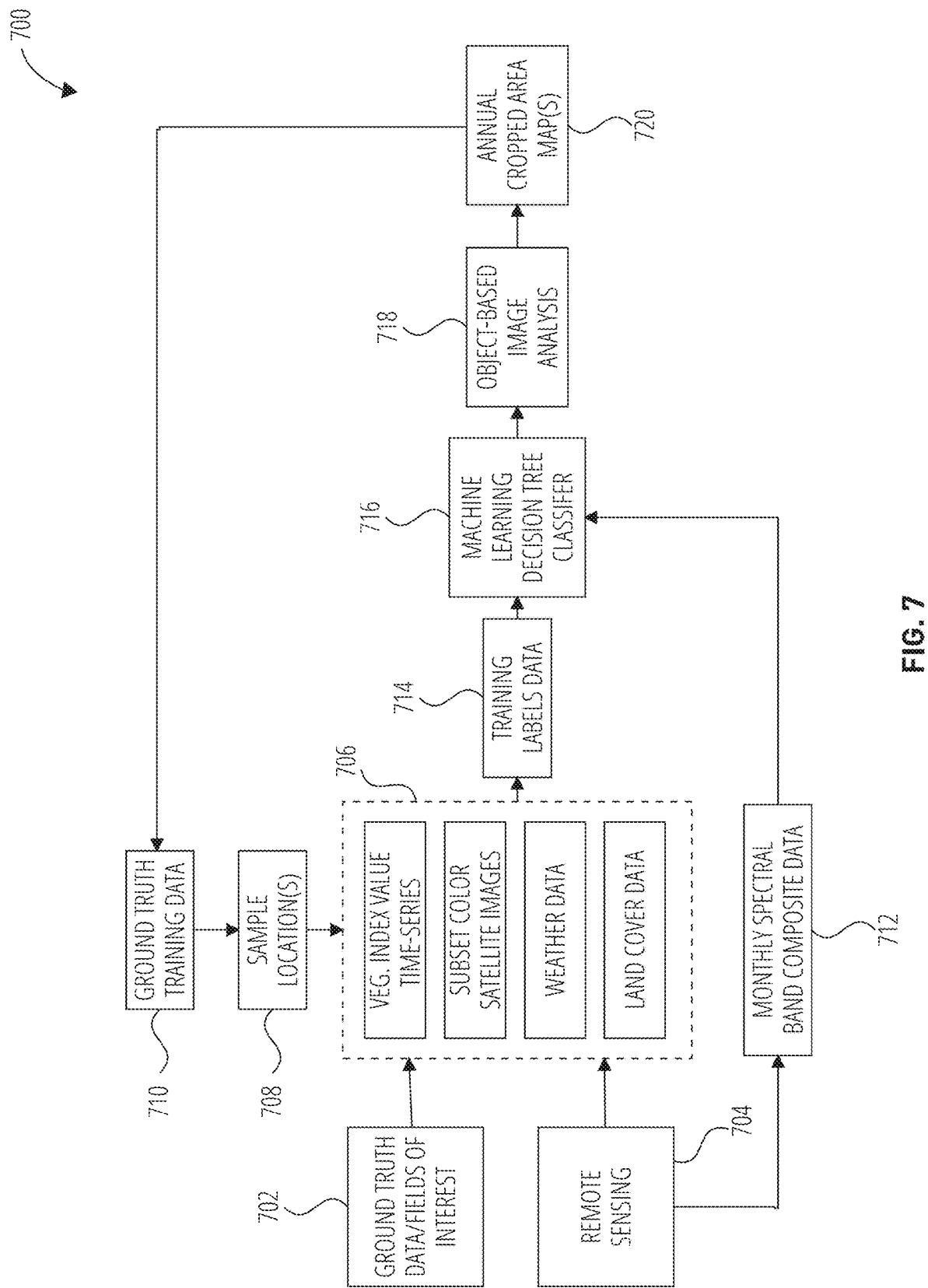
FIG. 7 is a flowchart illustrating an example data flow for generating one or more cropped area maps for regional market intelligence, according to various embodiments of the present disclosure.

FIG. 7 is a flowchart 700 illustrating an example data flow for generating one or more cropped area maps for regional market intelligence, according to various embodiments of the present disclosure. According to some embodiments, the flowchart 700 illustrates implementation of at some part of the method 300 described above with respect to FIG. 3. The flowchart 700 illustrates an quantitative analysis of cropped areas to generate cropped area maps (e.g., maize, wheat/barley, sunflower, and soybean maps), particularly in geographic regions with small farm fields. Overall, the flowchart 700 uses a machine learning decision tree classifier 716, which can be implemented using a knowledge-based data mining technique. As shown, data 706 includes time-series of vegetation index values, subset of color satellite images data, weather data, and land cover data. Depending on embodiment, the data 706 is generated based on, or compiled from, ground truth data & fields of interest 702 data and satellite remote sensing 704 data. Training labels data 714 (e.g., comprising 900-10,000 training labels) is generated using data 706 and the training labels data 714 is used to train a machine learning decision tree classifier 716. Once trained, the machine learning decision tree classifier 716 is used to generate one or more cropped area maps based on monthly spectral band composite data 712, which is generated based on the satellite remote sensing 704 data. Eventually, object-based image analysis 718 is applied to the one or more cropped area maps to generate one or more one or more annual cropped area maps 720, which can represent the final cropped area maps generated by the flowchart 700. Using ground truth data & fields of interest 710 from the geographic region, the one or more annual cropped area maps 720 can be evaluated to generate new training labels in regions with poor accuracy. The new training labels is represented by the one or more sample locations 708, which are added the data 706 for subsequent training iterations of the machine learning decision tree classifier 716.

Figure 8:
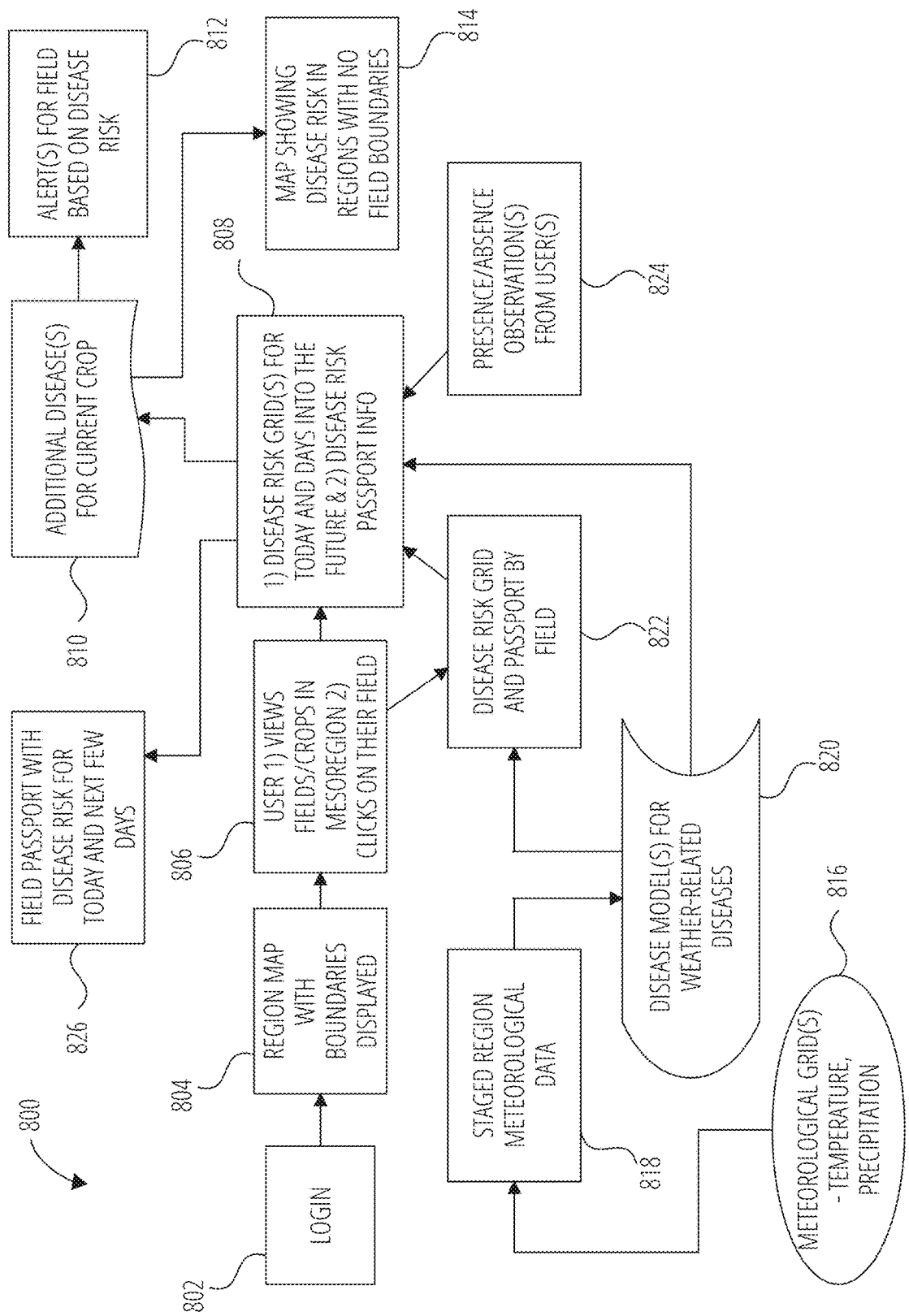
FIG. 8 is a flowchart illustrating an example data flow for crop disease risk analysis, according to various embodiments of the present disclosure.

FIG. 8 is a flowchart 800 illustrating an example data flow for crop disease risk analysis, according to various embodiments of the present disclosure. According to some embodiments, the flowchart 800 illustrates implementation of at some part of the method 400 described above with respect to FIG. 4. The flowchart 800 illustrates data ingestion and use of fungal models for disease risk analysis and, in particular, represents using meteorological information to drive agronomic models that estimate the probability of an outbreak of a fungal crop disease in the future (e.g., coming days or weeks). As described herein, weather-driven crop diseases have caused significant loss to crop farmers, especially soybean and maize farmers around the world. Elevated CO2 level and higher temperatures are likely to significantly influence the prevalence and virulence of fungal crop diseases and reduce the crop production. The crop disease risk analysis of some embodiments can provide early indication of weather conditions that may enhance the probability of fungal crop disease outbreaks for certain crop (e.g., soybeans), which can permit a user to intervene before yield loss occurs.

Referring now to flowchart 800, after a login 802 by a user, a region map 804 with boundaries displayed can be presented to the user and, through the region map 804, the user can view multiple farm fields/crops in a mesoregion and click on (e.g., select) on their farm field of interest (at user view and click 806). Based on user view and click 806, at 808 the user is presented with one or more disease risk grids (for today and days in the future) for the farm field of interest and a disease risk passport information for the farm field of interest. Example of disease risk grids and disease risk passports are illustrated with respect to FIG. 18, FIG. 19, and FIG. 27.

At 822, the disease risk gird and the disease risk passport information can be selected (e.g., filtered) by field and presented at 808 accordingly. Data presented by the disease risk gird or the disease risk passport information is generated by one or more disease models 820 for weather-related crop diseases. The one or more disease models 820 generates disease risk data (e.g., disease risk pressure values) based on staged region meteorological data 818 data for relevant grids, where the staged region meteorological data 818 is prepared from one or more meteorological grids 816 data. The one or more meteorological grids 816 data can provide temperature, precipitation, or both information for multiple grids. As also shown, data presented by the disease risk grid or the disease risk passport information can be generated from one or more presence/absence observations 824 from one or more users for the geographic region.

From 808, the user can choose to view a field passport 826 for the farm field of interest for today and the next few days, or one or more additional diseases 810 for current crop. After view the one or more additional diseases 810, the user can choose to be presented by a map 814 showing disease risk in geographic regions with no field boundaries shown. Additionally, one or more alerts 812 for one or more farm fields can be generated based on disease risk pressure as indicated by information presented in the disease risk grids/disease risk passport. The one or more alerts 812 can include 'emojis' or icons that communicate severity of underperformance or actions the user should take.

An example use case of the flowchart 800 can include determining (e.g., estimating) fungal disease risk, such as early blight, late blight, and downy mildew, for tomatoes using weather data and a fungal risk model as described herein. For this tomato disease risk use case, the one or more disease models 820 can be calibrated for differences in seasonal impact of weather, inter-annual variability in disease impact and differences in geography across the country using 'beacon' data, or ground observations. Each ground observation can include the time, location, the crop, the crop variety, the disease observed and the survey date. In some instances, approximately 20 observations of initial disease prevalence for each crop across the country may be used to calibrate the risk level. The one or more disease models 820 can be used to produce a risk probability value from 1 to 100. Ground truth data can be used to partition these values into 'very low', 'low', 'medium', 'high' and 'very high' risk of fungal disease outbreak. Based on the risk probability value, one or more alerts 812 can be issued to a user (e.g., agronomists), who can decide to send alerts to farmers using 'emojis' or icons that communicate the systems' disease risk severity and actions the farmers should take (e.g., as discussed or setup with the agronomist when signing up). Various alerts described herein can be provided in a local language and can be written by the local agronomists or agent teams using an embodiment.

With continued reference to this use case, an agronomist (e.g., working as a retailer or for a retailer) can register a farmer into an embodiment (e.g., with the farmer's name and phone number). The agronomist can enter into the embodiment the location of the farmer fields, the planting date of the tomato crop, and tomato variety. The agronomist can communicate with the farmer about the disease risk using alerts, which they can receive via SMS. Some embodiments are designed such that an agronomist access a disease risk analysis system, but is never accessed by a farmer. The disease risk analysis system can provide information viewable across a landscape for a sponsor of the system to better understand the need for engagement, advice and to ensure that they monitor overall productivity of an agriculture value chain. This can allow for early and appropriate interventions of growing conditions that may cause widespread reductions in production. Beacons, or field observations, provided by trained agronomists can help leverage high-level expertise across thousands of farmers, while increasing the understanding of day-to-day disease and pest problems by the primary advice-givers on the system.

Figure 9:
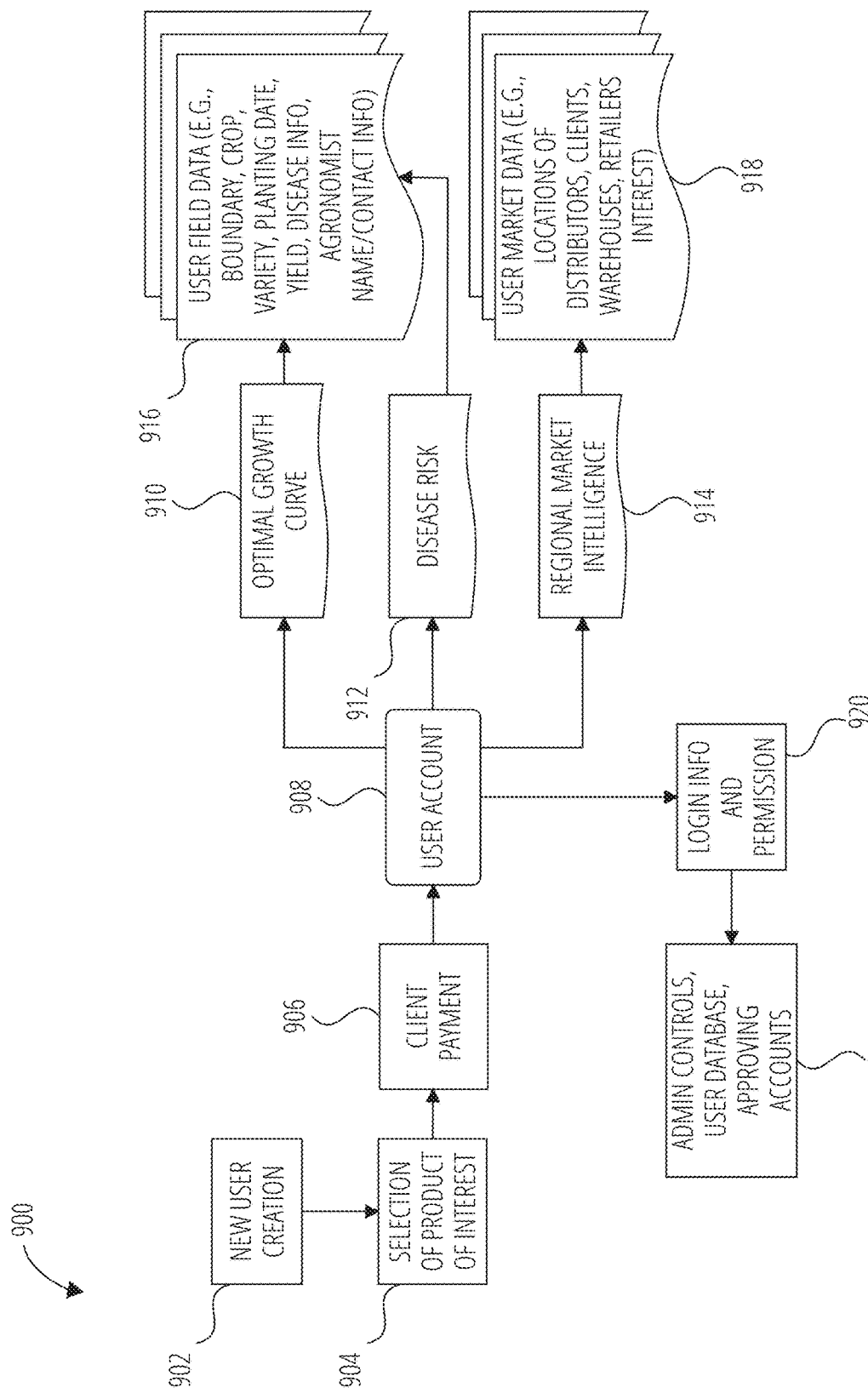
FIGS. 9 and 10 are flowcharts illustrating example user flows through a platform that supports multiple tools, including crop growth curve generation, regional market intelligence, and disease risk analysis, according to various embodiments of the present disclosure.

FIG. 9 is a flowchart 900 illustrating an example user flow through a platform that supports multiple tools, including crop growth curve generation, regional market intelligence, and disease risk analysis, according to various embodiments of the present disclosure. The flowchart 900 illustrates use of the platform with and without uploading data (e.g., using an automated data ingest tool), and illustrates how the platform can deliver a streamlined user experience. The platform can upload and store information regarding one or more of their fields of interest, management practices, production from previous years, and other needed farm management details. Use of the platform can permit a user to receive benefits from the platform without need for uploading any information, relying instead on machine learning models to generate the information (e.g., field boundary and crop type information) each season.

As shown, an individual registers with the platform and causes a new user creation 902. As part of new user creation 902, the new user is provided a username and password for accessing the platform. After the new user has selected a product (or tool) of interest at 904, the new user submits client payment 906. Eventually, the new user logs into the platform and accesses their user account 908, and asked for farm field related information or data relevant to the one or more products/tools they selected at 904. For instance, for crop optimal growth curve 910 and disease risk analysis disease risk 912 tools, one or more of the following information/data 916 can be provided by the new user (e.g., via an uploaded file, such as a spreadsheet file): field boundary coordinates; crop type and variety; planting date; previous years' yields; diseases of concern and loss each year; and agronomist name and contact information (if available). At least some of this information can be presented to the new user through a field passport displayed for an individual farm field of interest. For regional marketing regional market intelligence 914 tool, one or more of the following information/data 918 can be provided by the new user (e.g., via an uploaded file, such as a spreadsheet file), which can be displayed on a regional map: locations of distributors; client locations; warehouse locations; retailers of interest; and regions of interest. User provided information for the regional marketing intelligence tool may be visible only to the user or user group who provided them.

As also shown, from the user account 908, the new user can access client payment 920 information, through which the new user can access various account features, such as admin controls, user database, and approving accounts 922.

Figure 10:
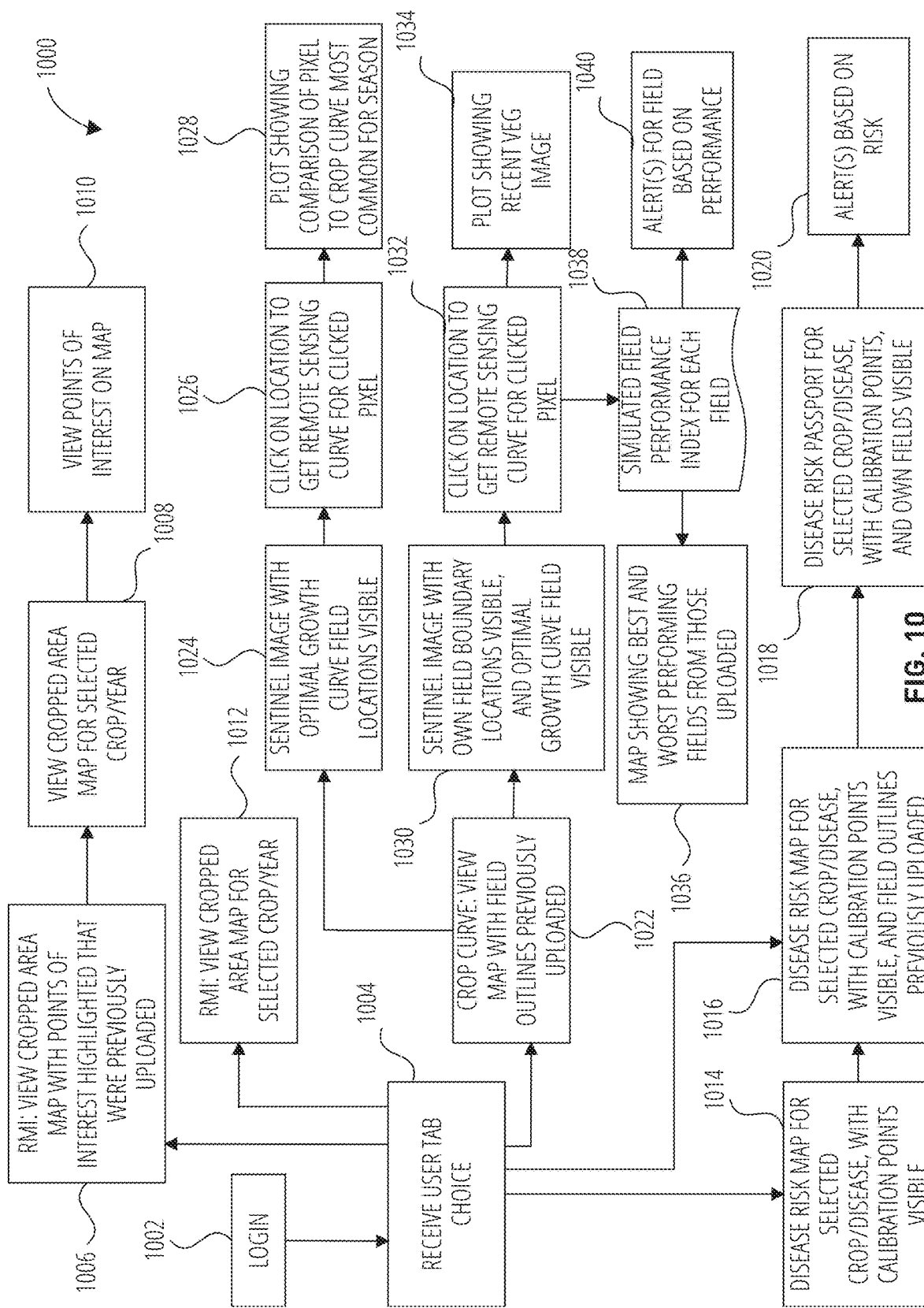

FIG. 10 is a flowchart 1000 illustrating an example user flow through a platform that supports multiple tools, including crop growth curve generation, regional market intelligence, and disease risk analysis, according to various embodiments of the present disclosure. According to some embodiments, the flowchart 1000 illustrates use of at some part of the method 200 of FIG. 2, the method 300 of FIG. 3, the method 400 of FIG. 4, or combination thereof.

After a login 1002 by a user, the user is presented with a user interface with multiple tabs corresponding to different tools, including the crop growth curve generation, the regional market intelligence (RMI), and the disease risk analysis tools. At 1004, a user tab choice is received, the user is navigated to the selected tab. For instance, based on the user choice at 1004, the user can be navigated to: RMI view 1006 that displays a cropped area map with points of interest highlighted that were previously uploaded (e.g., by flowchart 900 of FIG. 9); RMI view 1012 that displays a cropped area map for a selected crop/year; crop growth curve view 1022 that displays a map with field outlines previously uploaded; disease risk map view 1014 for a selected crop/disease with calibration points visible; and disease risk map view 1016 for a selected crop/disease with calibration points visible, and field outlines previously uploaded.

From the view 1006, the user can view a cropped area map for a selected crop/year at 1008, and can view points of interest on the cropped map at 1010. From the view 1022, the user can view a Sentinel image 1024 with optimal growth curve field locations visible. The user can click 1026 a location to receive satellite remove sensing curve for a clicked pixel. Subsequently, the user can access plot 1028 that shows a comparison of pixel to crop growth curve most common for the current season. Alternatively, from the view 1022, the user can view Sentinel image 1030 with field boundary locations visible, and optimal growth curve field visible. The user can click 1032 a location to receive satellite remove sensing curve for a clicked pixel. Subsequently, the user can access plot 1034 that shows a recent vegetation image, or view a simulated field performance index 1038 value for each field of interest. From the simulated field performance index 1038 value, one or more alerts 1040 for a field can be generated based on the simulated field performance index value. Additionally, from the simulated field performance index 1038 value, a map 1036 showing the best and worst performing fields can be displayed.

From the disease risk map view 1016, the user can access the disease risk passport 1018 for selected crop/disease, with calibration points, and own fields visible. Based on the disease risk information on the disease risk passport 1018, one or more alerts 1020 can be generated for a farm field of interest.

Figure 11:
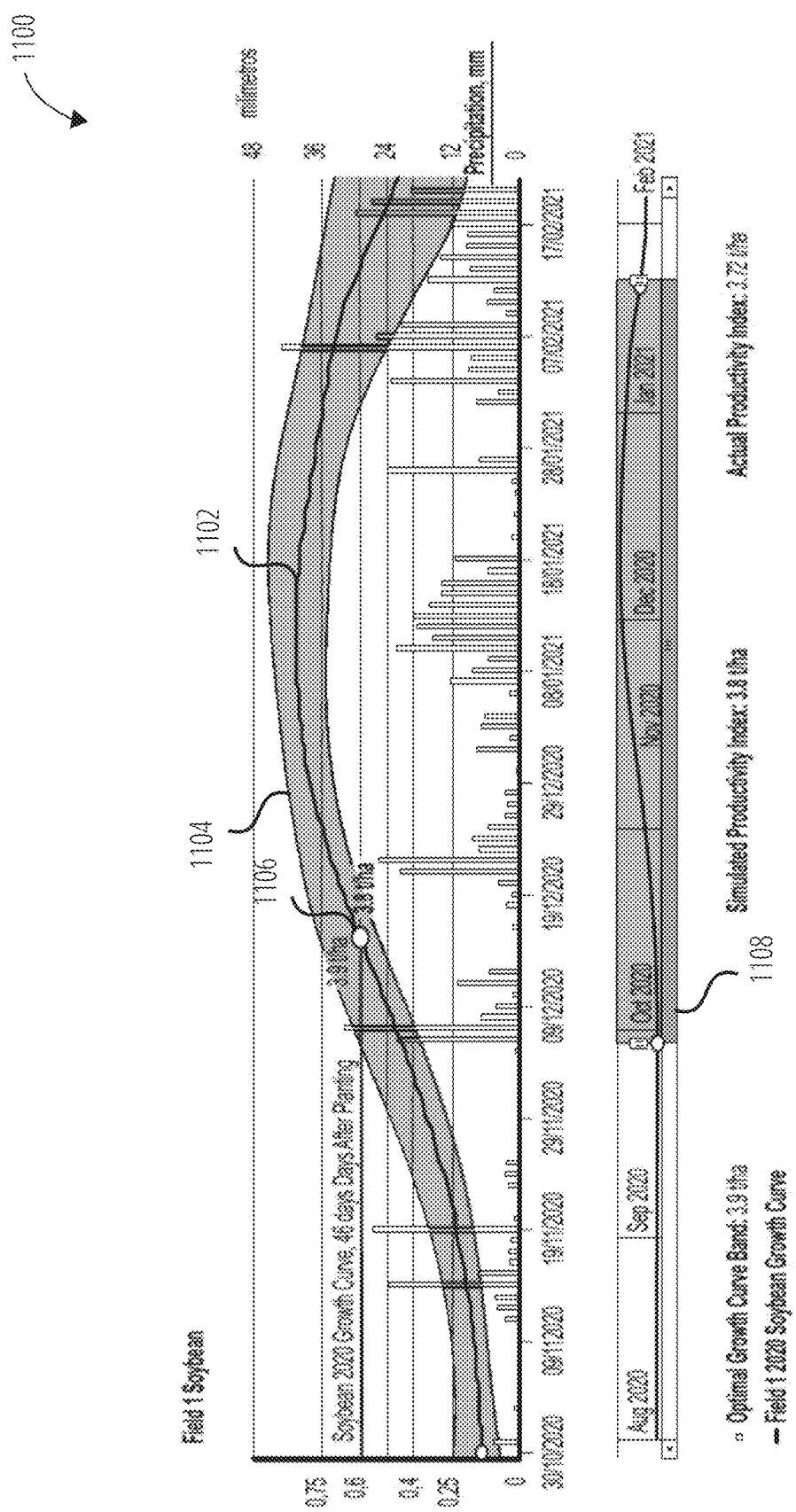
FIGS. 11 through 13 illustrate example graphs generated with crop growth curves and comparisons to crop growth bands for farm fields of interest, according to various embodiments of the present disclosure.
Figure 12:
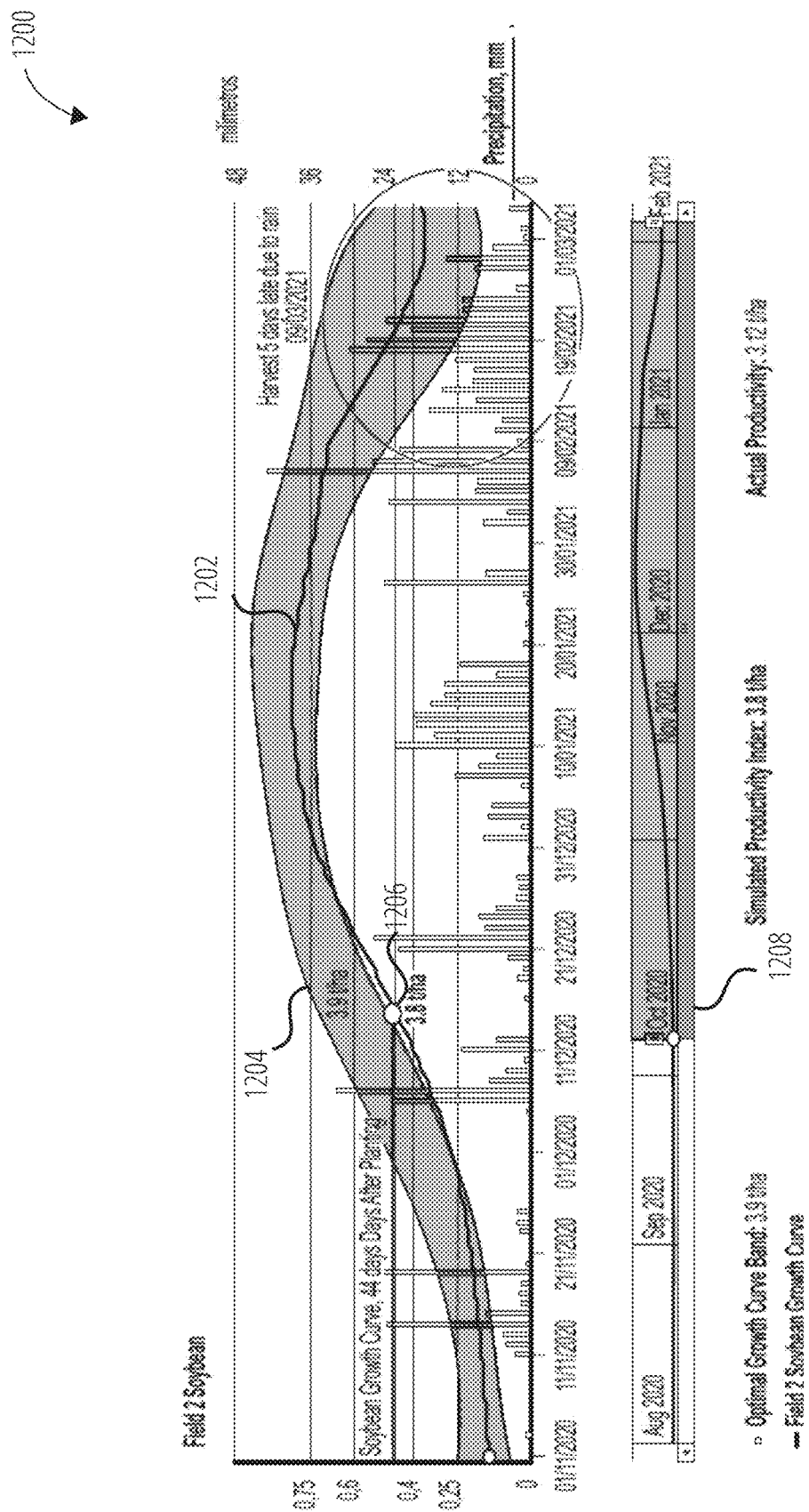
Figure 13:
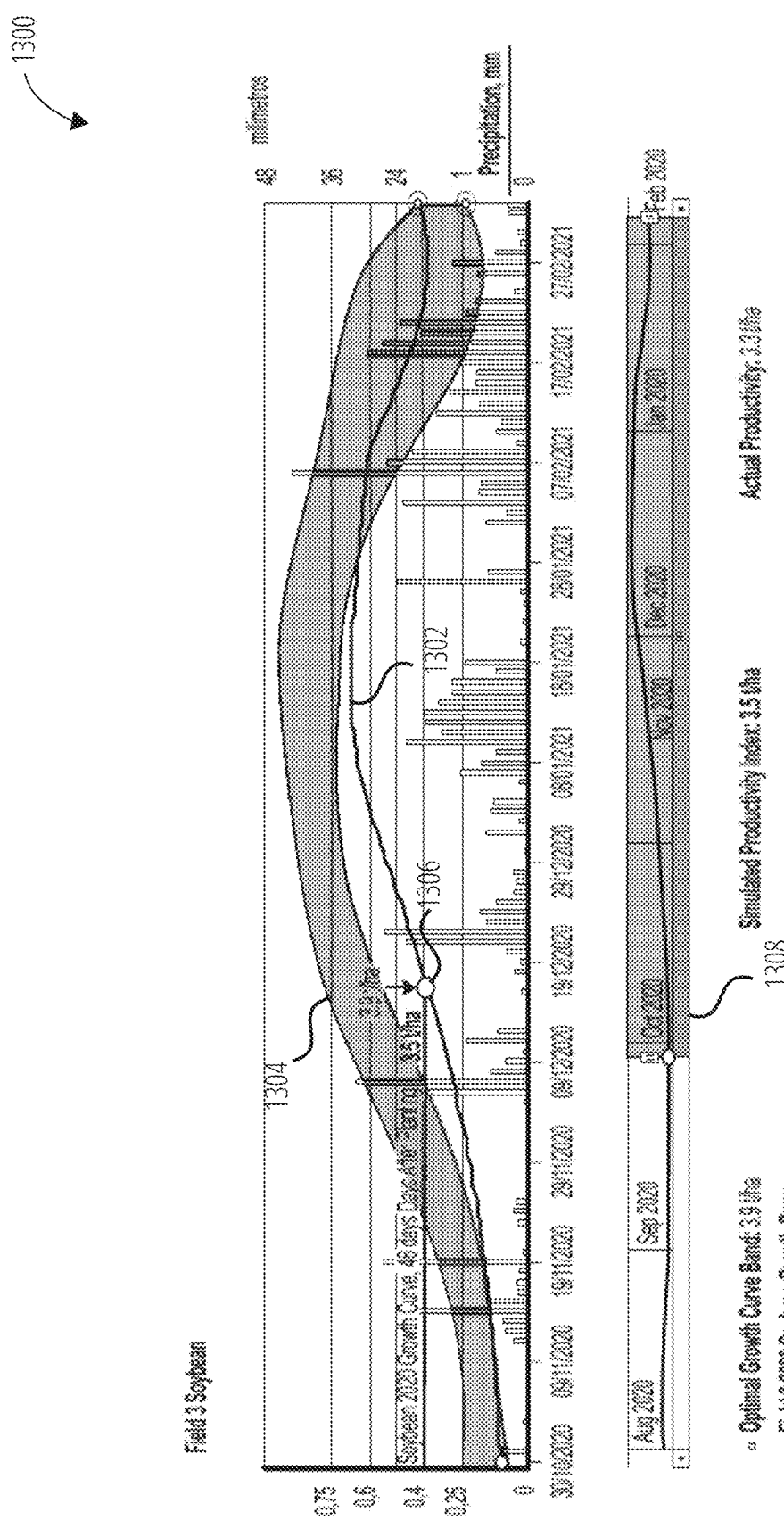

FIGS. 11 through 13 illustrate example graphs 1100, 1200, and 1300 generated with crop growth curves and comparisons to crop growth bands for farm fields of interest, according to various embodiments of the present disclosure. According to various embodiments, each of the example graphs 1100, 1200, and 1300 can be presented to a user on a client user interface (e.g., graphical user interface), and can enable interactions with the presented curve or band, including selecting range of time for which the curve or band is to be displayed or selecting a point on a crop growth curve to review a specific vegetation index value at that point.

Referring now to graph 1100 of FIG. 11, a crop growth curve 1102 is generated and presented with a crop growth band 1104. In response to a user selecting a point on the crop growth curve 1102, the graph presents a specific vegetation index value at that point. As shown by graph 1100, the crop growth curve 1102 of the farm field of interest ("Field 1 Soybean") is compared to compared to the crop growth band 1104, which enables a user to track growth of the soybean crop canopy. As shown in the graph 1100, the crop growth curve 1102 remains within the crop growth band 1104 for the range of time selected and displayed by the graph 1100. Using an yield analysis tool of an embodiment, a simulated productivity index value (also referred to herein as the simulated field performance index value or simulated yield value) of 3.8 tons per hectare (t/ha) (after 45 days of planting the crop) for the farm field of interest is determined and displayed on the graph 1100, as indicated at 1106. As shown, the target productivity index value of the crop growth band 1104 is 3.9 t/ha, and the actual productivity index value is 3.72 t/ha. As described herein, a user can monitor the crop growth curve 1102 using a client device (e.g., in the field) to ensure that the development of their crop closely matches the trajectory of the crop represented in the crop growth band. Graph 1100 can effectively enable a user to compare of their farm field's vegetation index value with those of thousands of other fields every day, which would not be feasible to do without use of an embodiment described herein. The graph 1100 includes a timeline interface 1108, which enables a user to select the range of time of the crop growth band 1104 and the crop growth curve 1102 to be currently presented through the graph 1100. As shown, the graph 1100 also provides with the crop growth curve 1102 and the crop growth band 1104 a rainfall time series in bars, which shows when additional rain fall on the farm field of interest may occur and the likely soil moisture conditions of the farm field of interest.

Referring now to FIG. 12, the graph 1200 of another farm field of interest ("Field 2 Soybean") is presented. Similar to the graph 1100, the graph 1200 includes a crop growth curve 1202, a crop growth band 1204, a point 1206, and a timeline interface 1208. The crop growth curve 1202 illustrates how the farm field of interest suffers problems at the start of the season as compared to the crop growth band 1204. In particular, the graph 1200 illustrates the farm field's vegetation trajectory is slightly below the crop growth band 1204 by point 1206, where the simulated productivity index value (at point 1206) is 3.8 t/ha after 44 days after planting the crop but the actual productivity index value has fallen to 3.12 t/ha. Example conditions that may have caused such poor performance of a soybean crop early in the season can include, without limitation, cold soil temperatures, excess or inadequate soil moisture, improper seeding depth, or insect or disease infestations. Based on reviewing the graph 1200, an agronomist can adjust management on the farm field in response to the undesirable trajectory (e.g., adjust by changing the frequency or timing of fertilizations, prophylactic chemicals, or the use of a rotary hoe to aerate the soil around seedlings when a crust is present).

Referring now to FIG. 13, the graph 1300 of another farm field of interest ("Field 3 Soybean") is presented. Similar to the graph 1100, the graph 1300 includes a crop growth curve 1302, a crop growth band 1304, a point 1306, and a timeline interface 1308. The crop growth curve 1302 illustrates how the farm field of interest has performed poorly throughout the season as compared to the crop growth band 1304. In particular, the graph 1300 illustrates how the farm field's crop canopy suffers when a user (e.g., agronomist or grower) does not end up responding to problems, which is illustrated by the crop growth curve 1302 falling significantly below the crop growth band 1304, and the actual productivity index value of 3.3 t/ha falling far below the simulated productivity index value of 3.5 t/ha and the targeted productivity index value of the crop growth band 1304 of 3.9 t/ha at point 1306.

Figure 14:
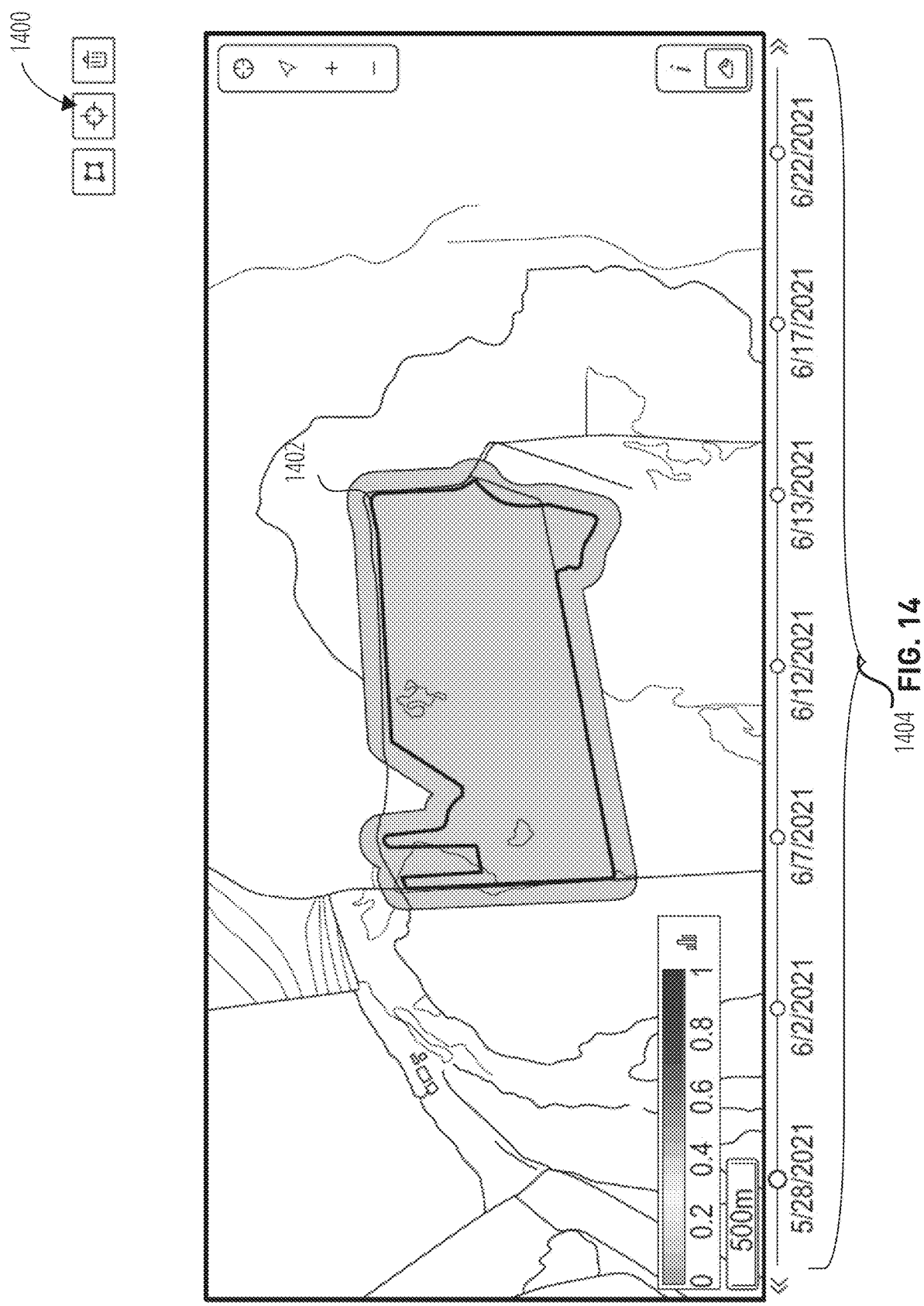
FIG. 14 illustrates an example user interface for viewing a heatmap of a field of interest based on vegetation index values, according to various embodiments of the present disclosure.
Figure 15:
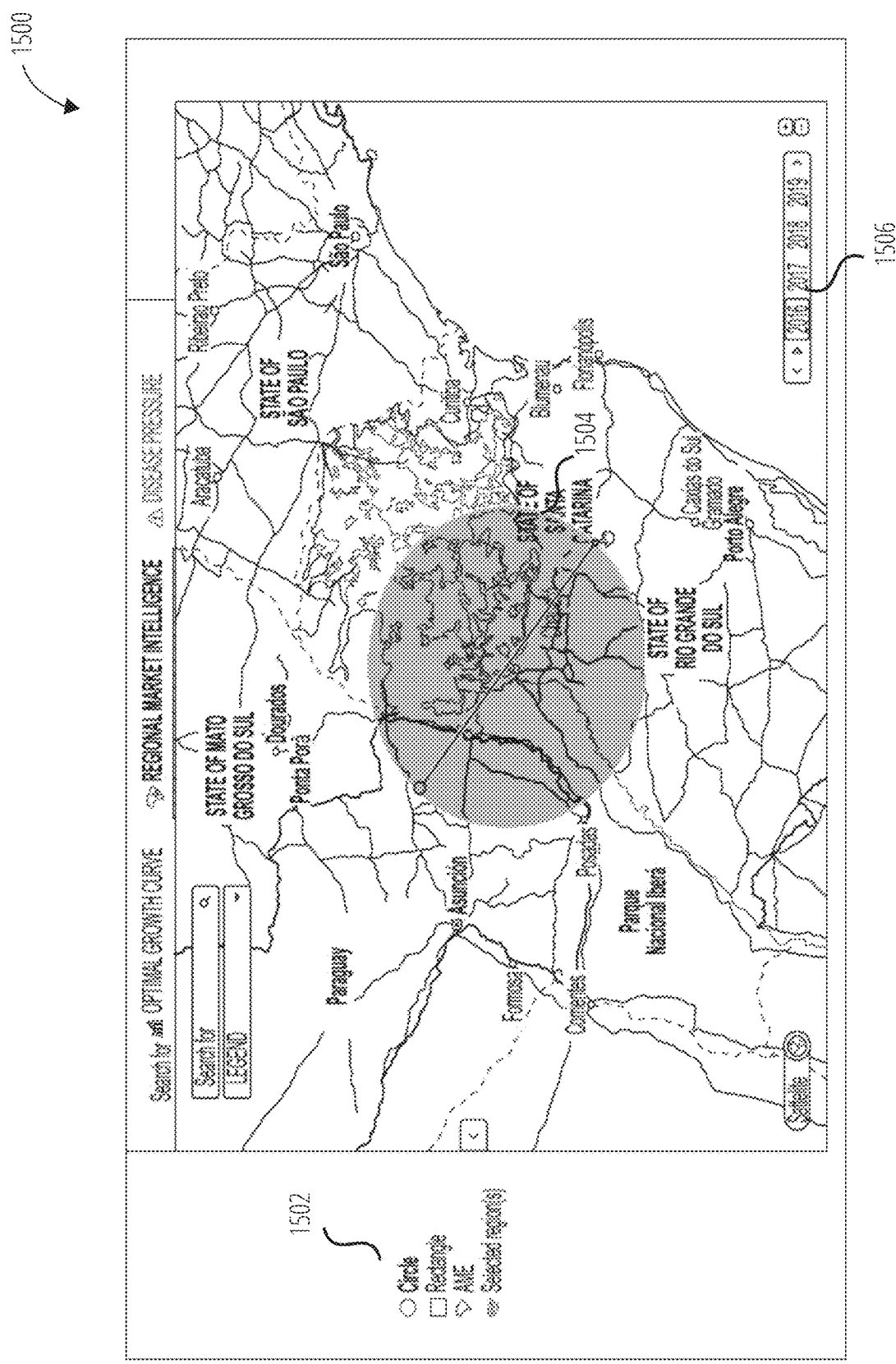
FIG. 15 illustrates an example user interface for selecting an area for regional market intelligence, according to various embodiments of the present disclosure.

FIG. 14 illustrates an example user interface 1400 for viewing a heatmap of a field of interest based on vegetation index values, according to various embodiments of the present disclosure. As shown, the farm field of interest is outlined by farm field boundary 1402. Within the farm field boundary 1402 is a heatmap that represents vegetation index values across the farm field of interest (e.g., with darker shading indicating a higher vegetation index value). A user can use the timeline interface 1404 to select and view the heatmap for the farm field of index at different points of time (e.g., May 28, 2021, Jun. 2, 2021, Jun. 7, 2021, Jun. 12, 2021, etc.) in the past, FIG. 15 illustrates an example user interface 1500 for selecting an area for regional market intelligence, according to various embodiments of the present disclosure. In particular, the user interface 1500 can be used by a user, as part of a regional market intelligence tool, to select an area (e.g., area of interest) of a geographic region to review market intelligence information for the selected area. As shown, the user can choose from one of the selection options listed in the legend 1502 (e.g., circle, rectangle, AME, etc.). For example, in FIG. 15, the user uses a circle selection shape 1504 to select an area over the map. Additionally, the user can use the timeline interface 1506 to select and view the map at different points of time (e.g., 2016, 2017, 2018, 2019) in the past.

Figure 16:
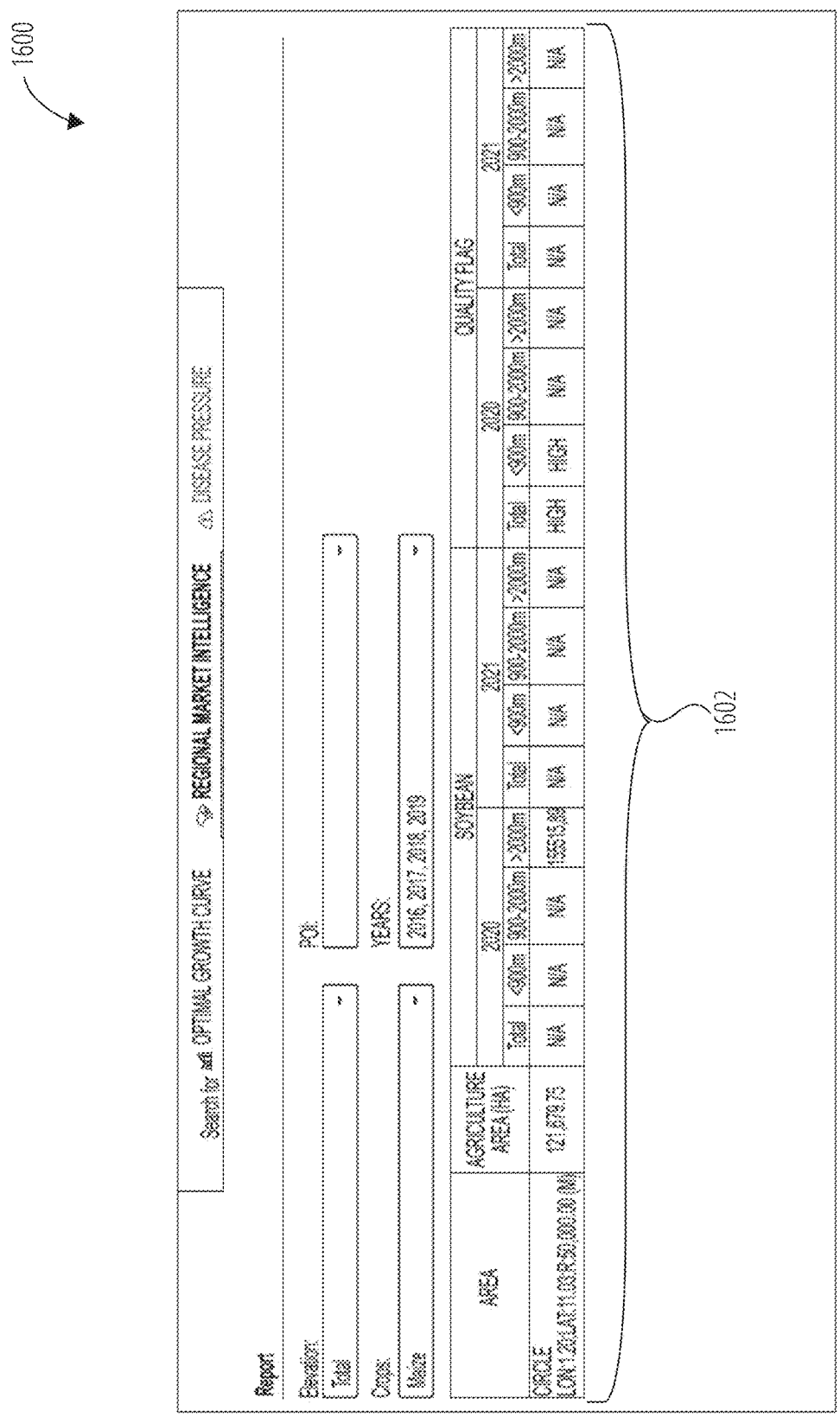
FIG. 16 illustrates an example user interface for regional market intelligence information for a selected area of a map, according to various embodiments of the present disclosure.

FIG. 16 illustrates an example user interface 1600 for regional market intelligence information for a selected area of a map, according to various embodiments of the present disclosure. In particular, based on the user selection of an area (e.g., as illustrated by FIG. 15), the user interface 1600 displays market information for the selected area pertaining to the selected area in table 1602. As shown, information describing the selected area is shown under the "AREA" column, and a total agricultural area is described under the column "AGRICULTURE AREA." The remainder of the table 1602, the crop yield for a selected crop (e.g., soybean) for particular years (e.g., 2020 or 2021), and a quality flags corresponding to those yields.

Figure 17:
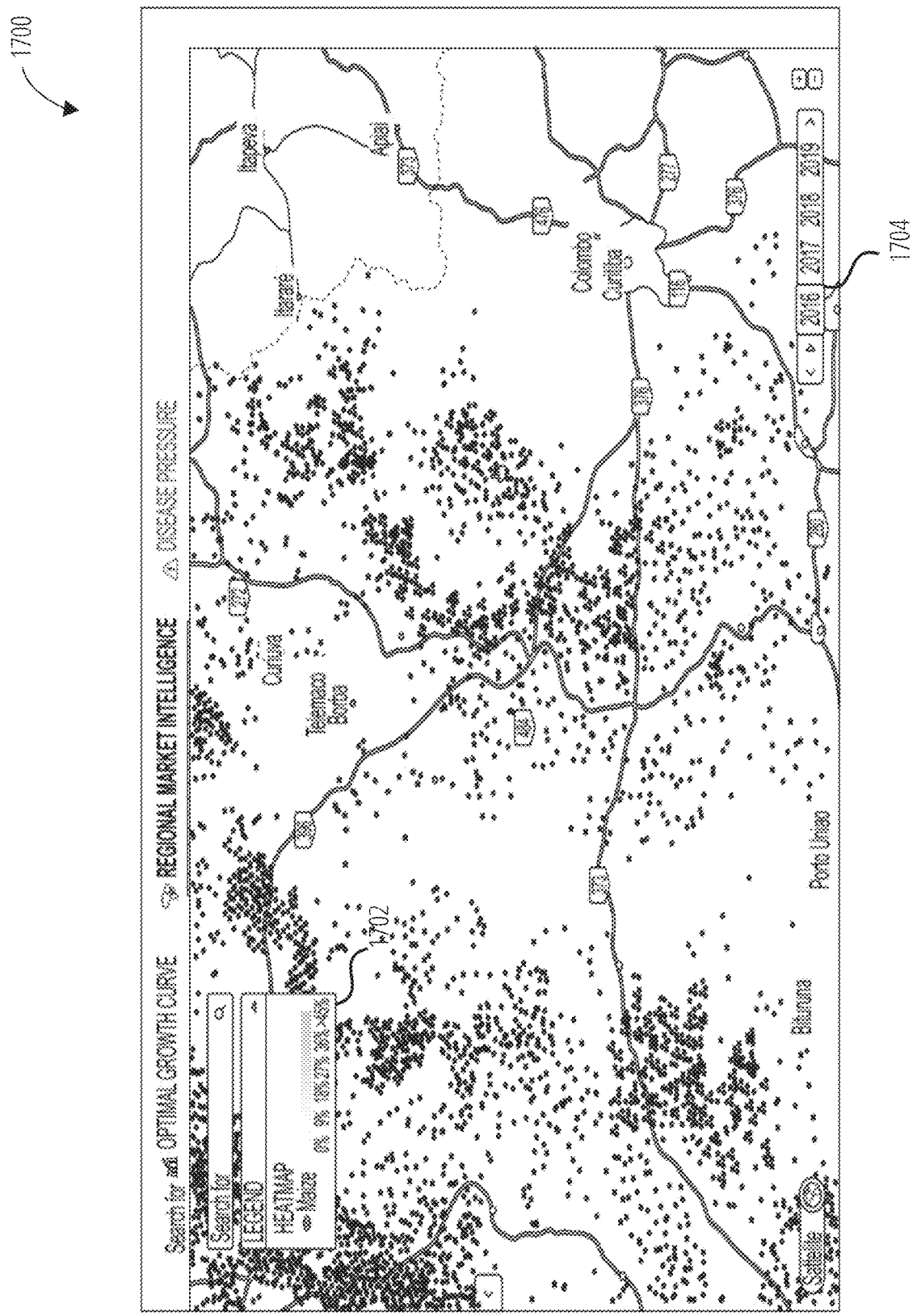
FIG. 17 illustrates an example user interface for a heatmap of a regional market intelligence tool for selected crops, according to various embodiments of the present disclosure.

FIG. 17 illustrates an example user interface 1700 for a heatmap of a regional market intelligence tool for selected crops, according to various embodiments of the present disclosure. In particular, the user interface 1700 displays a heatmap illustrating maize planted across a geographic region. The legend 1702 provides a gauge for reviewing the heatmap, which indicates that darker shading on the heatmap indicates higher density of maize crop planted. Additionally, the user can use the timeline interface 1704 to select and view the heatmap at different points of time (e.g., 2016, 2017, 2018, 2019) in the past.

Figure 18:
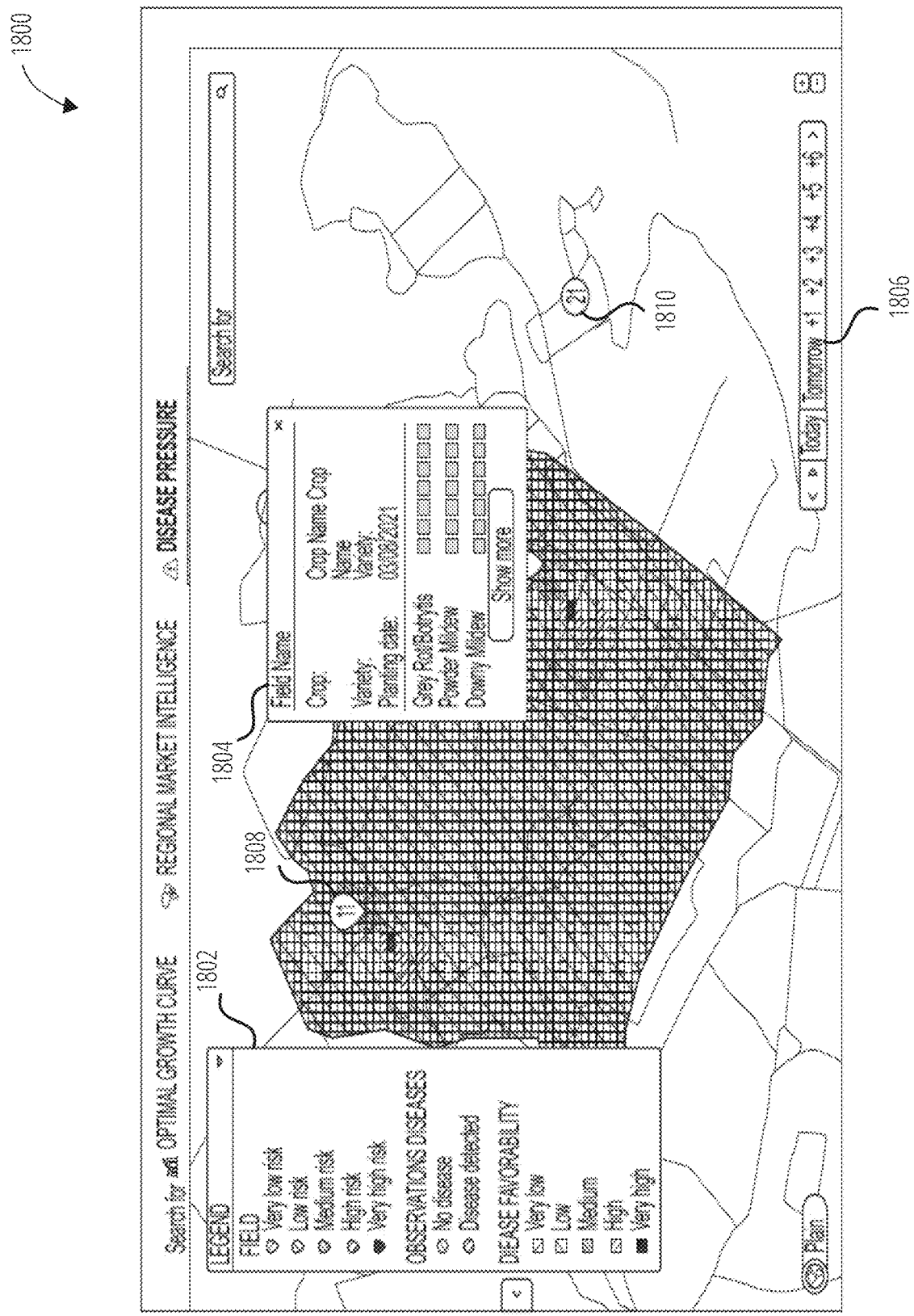
FIG. 18 illustrates an example user interface for disease risk map for one or more farm fields of interest, according to various embodiments of the present disclosure.

FIG. 18 illustrates an example user interface 1800 for disease risk map for one or more farm fields of interest, according to various embodiments of the present disclosure. As shown, the user interface 1800 displays a map that includes the one or more farm fields of interest. A grid of tiles is displayed over the one or more farm fields as an overlay, where the tiles correspond to tile images obtained from satellite remote sensing data. Each of the tiles can be shaded or marked-up according to a legend 1802 to covey different disease risk pressure information for the one or more farm fields. According to various embodiments, a user can select one of the tiles to view a disease risk passport 1804 for the selected tile, where the disease risk passport 1804 provides detailed information regarding the selected tile, including disease risk pressure information. With respect to tiles exhibiting high disease risk pressure, the user interface 1800 can display a markers, such as marker 1808, which can not only mark such tiles but also provide a number that represents an overall amount of disease risk pressure for those tiles. Further, the user interface 1800 can display a marker, such as marker 1810, which can provide a number that represents an overall amount of disease risk pressure exhibited by an unselected farm field of interest on the map. Additionally, the user can use the timeline interface 1806 to select and view the disease risk map at different points of time (e.g., 2016, 2017, 2018, 2019) in the past.

Figure 19:
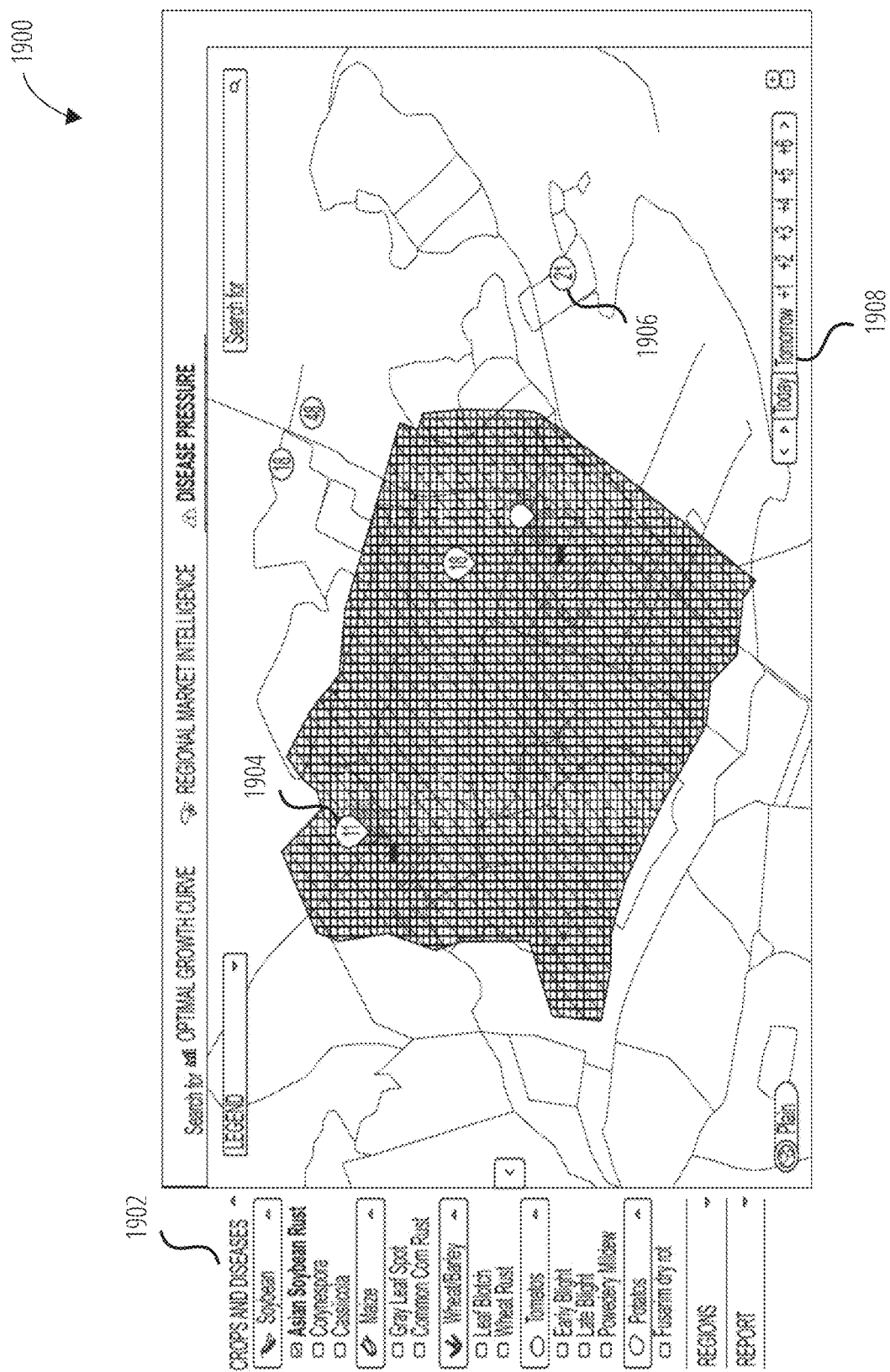
FIG. 19 illustrates an example user interface for disease risk map for one or more farm fields of interest, according to various embodiments of the present disclosure.

FIG. 19 illustrates an example user interface 1900 for disease risk map for one or more farm fields of interest, according to various embodiments of the present disclosure. In particular, the user interface 1900 is similar to the user interface 1800 of FIG. 18, and includes markers 1904 and 1906, and a timeline interface 1908. The user interface 1900 also includes a crop/disease selection interface 1902, which can permit a user to filter disease risk pressure information, displayed on the user interface 1900, based on one or more selected crops, crop diseases, or some combination thereof.

Figure 20:
FIG. 20 illustrates an example user interface for viewing one or more farm fields of interest by overall vegetation index value, according to various embodiments of the present disclosure.

FIG. 20 illustrates an example user interface 2000 for viewing one or more farm fields of interest by overall vegetation index value, according to various embodiments of the present disclosure. As shown, a marker 2002 can be used to select an individual farm field of interest having a farm field boundary 2004.

Figure 21:
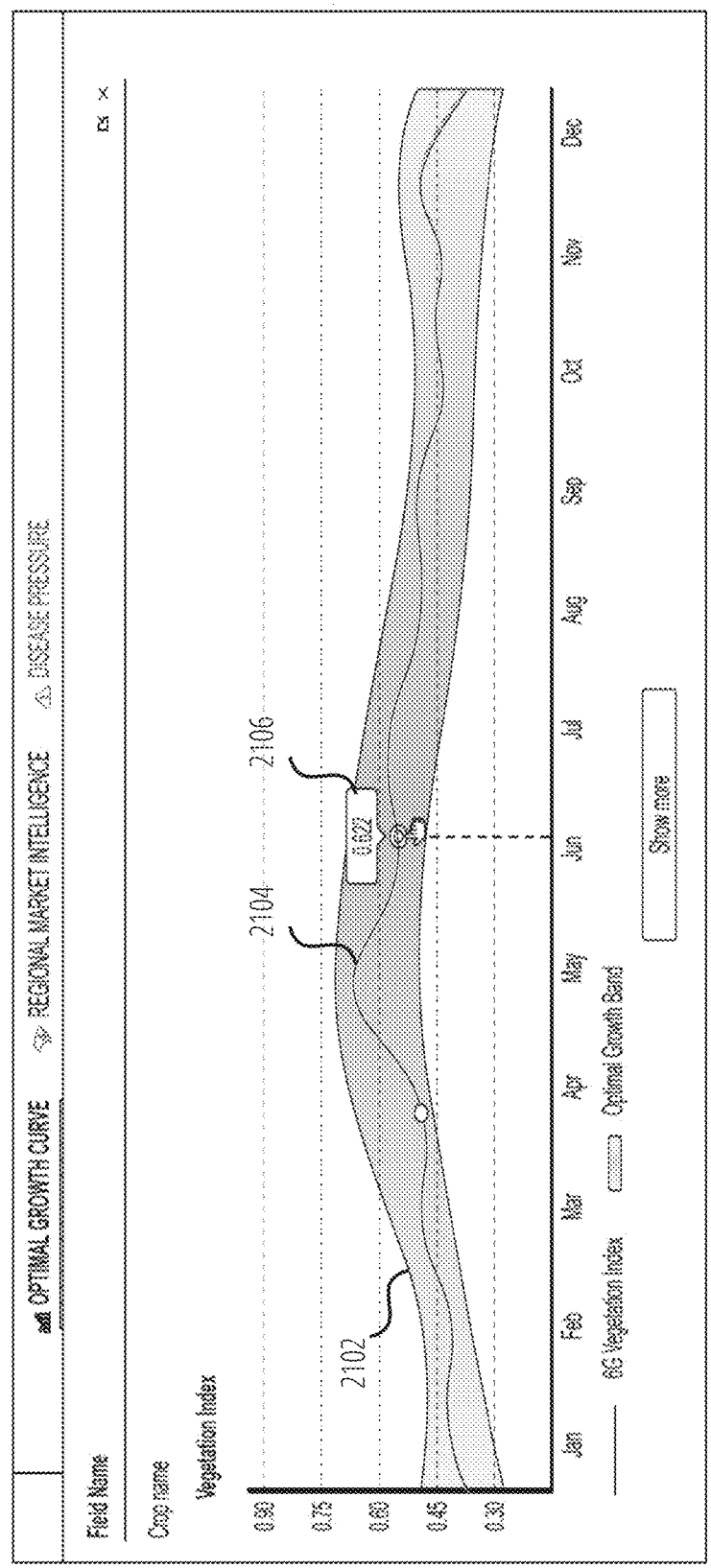
FIG. 21 illustrates an example user interface for example graph generated with a crop growth curve and a comparison a crop growth band for a farm field of interest, according to various embodiments of the present disclosure.

FIG. 21 illustrates an example user interface 2100 for example graph generated with a crop growth curve 2104 and a comparison a crop growth band 2102 for a farm field of interest, according to various embodiments of the present disclosure. As shown, the crop growth curve 2104 remains within the crop growth band 2102 for the range of time selected. At a user selected point, a marker 2106 indicates a vegetation index value of 0.622.

Figure 22:
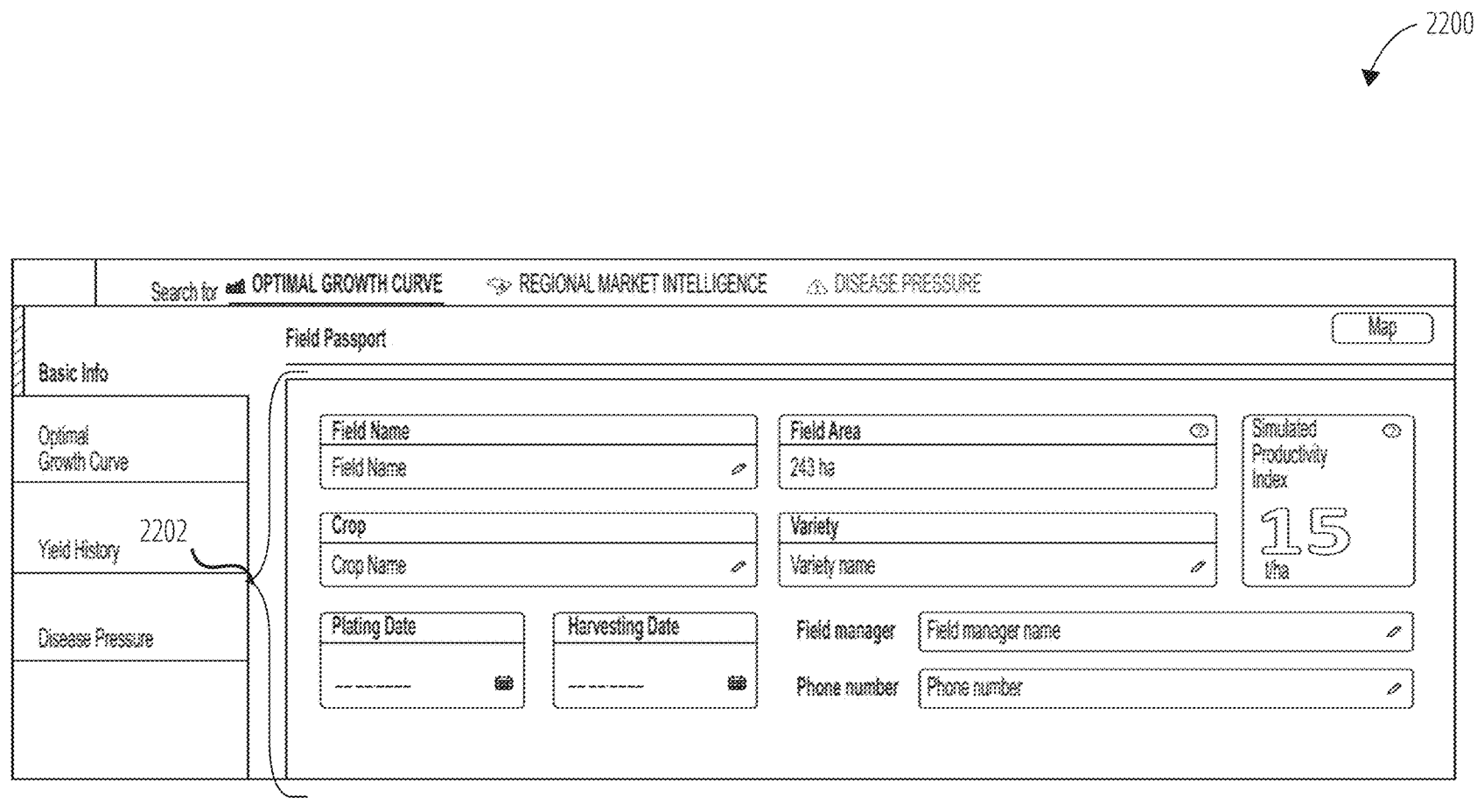

FIG. 22 illustrates an example user interface 2200 for a field passport for an individual farm field of interest, according to various embodiments of the present disclosure. As shown, the field passport of FIG. 22 presents a summary of information 2202 for the individual farm field of interest including, for example, a field name, field size/area, crop type, crop variety type, planting date, harvesting date, field manager information and contact information, and a current simulated productivity index value (or simulated field performance index value) for the farm field of interest (e.g., 15 t/ha).

Figure 23:
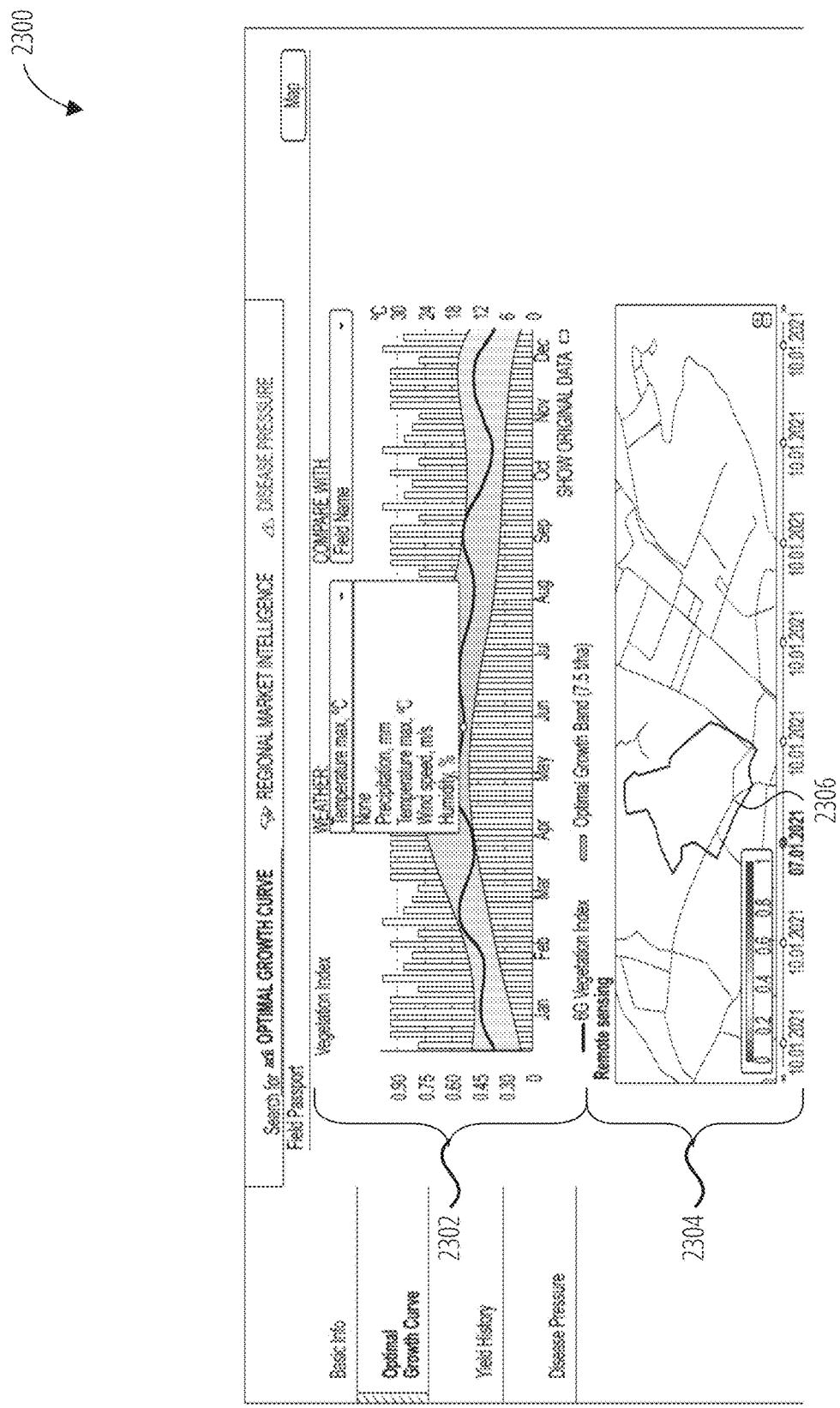

FIG. 23 illustrates an example user interface 2300 for a field passport for an individual farm field of interest, according to various embodiments of the present disclosure. As shown, the field passport of FIG. 23 presents a graph 2302 displaying a crop growth curve, a crop growth band, and precipitation information for the individual farm field of interest. Additionally, the field passport of FIG. 23 presents a heatmap 2304 of vegetation index values for the individual farm field of interest (having a farm field boundary 2306) over different time points.

Figure 24:
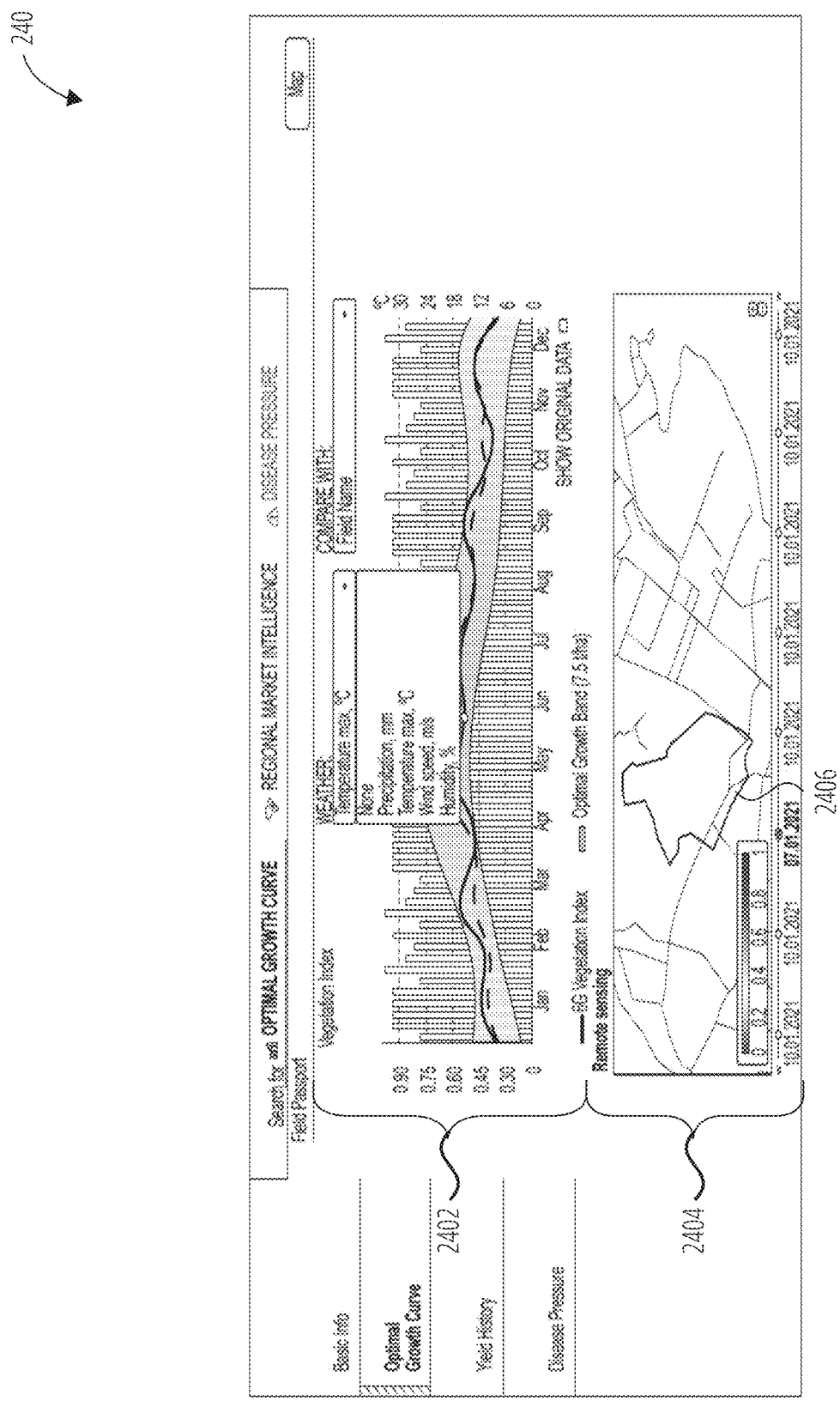

FIG. 24 illustrates an example user interface 2400 for a field passport for an individual farm field of interest, according to various embodiments of the present disclosure. In particular, the user interface 2400 is similar to the user interface 2300 of FIG. 23, and includes a graph 2402 and a heatmap 2404 for the individual farm field of interest (having a farm field boundary 2406). Additionally, the graph 2402 presents a comparison of a current crop growth curve of the individual farm field of interest in comparison to a prior crop growth curve (e.g., in dashed lines) of the same farm field (e.g., for a prior year).

Figure 25:
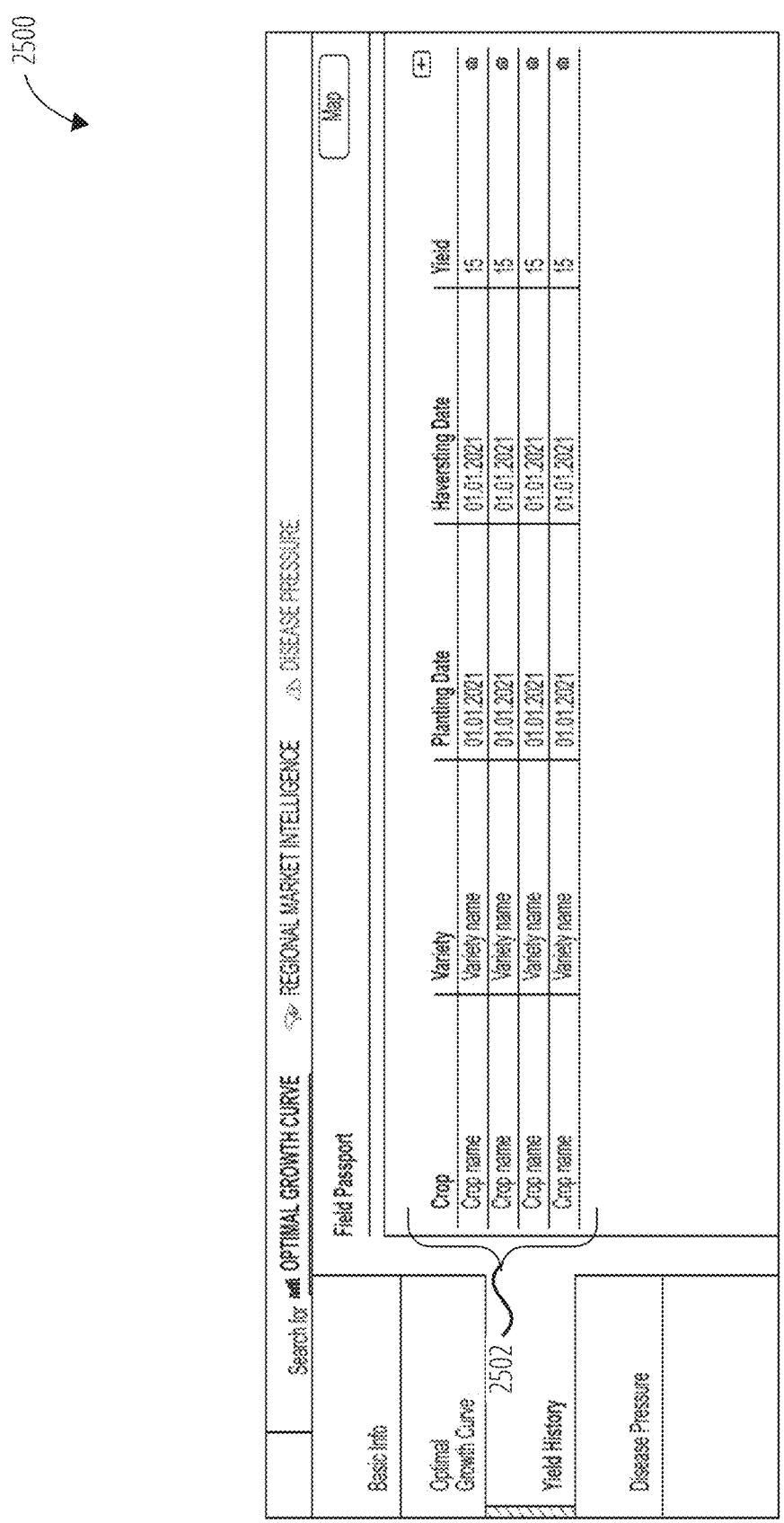

FIG. 25 illustrates an example user interface 2500 for a field passport for an individual farm field of interest, according to various embodiments of the present disclosure. In particular, the user interface 2500 displays a yield history 2502 for the individual farm field of interest.

Figure 26:
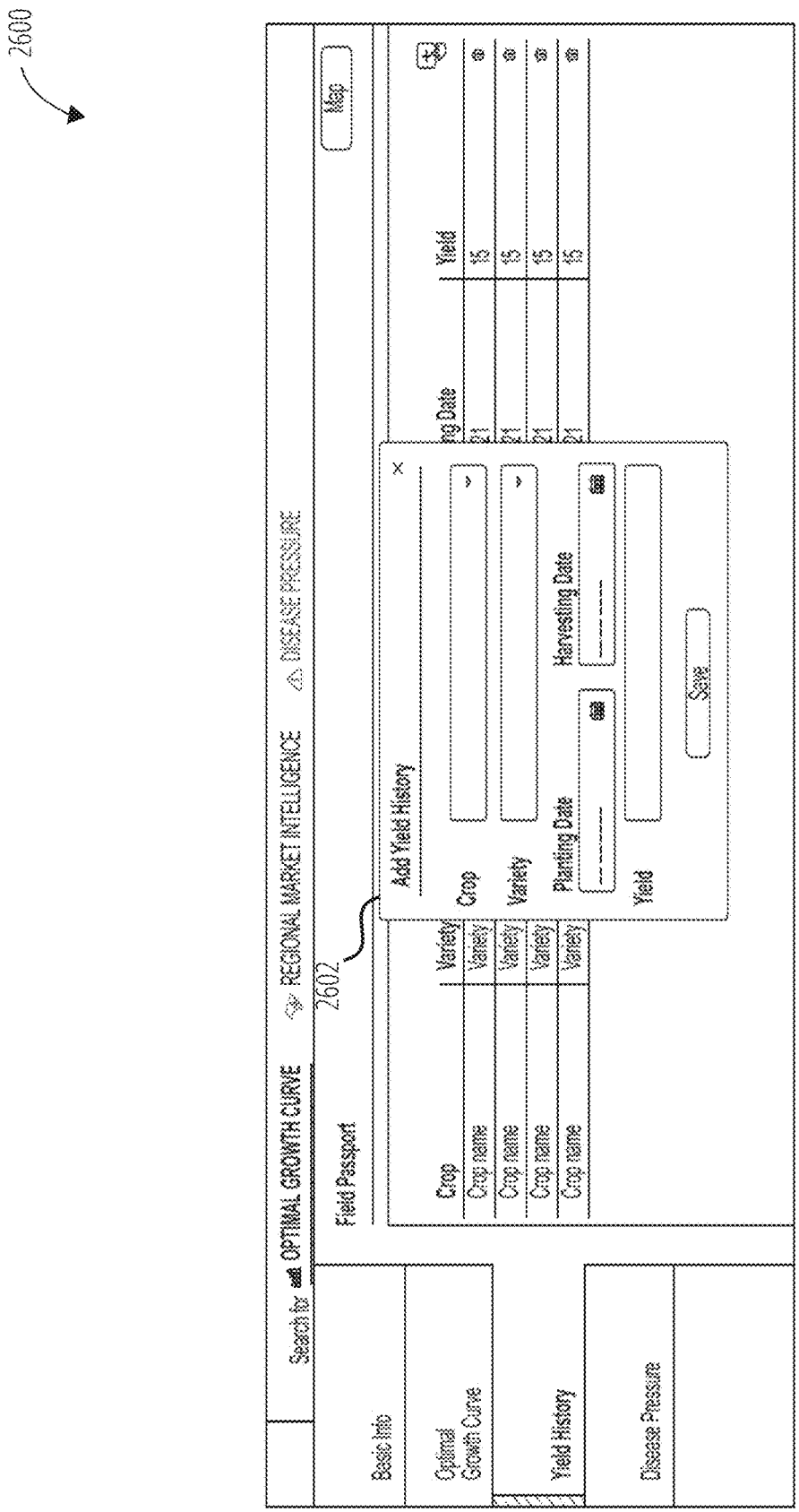

FIG. 26 illustrates an example user interface 2600 for a field passport for an individual farm field of interest, according to various embodiments of the present disclosure. In particular, the user interface 2600 displays a window 2602 that permits a user to enter and add yield history for the individual farm field of interest.

Figure 27:
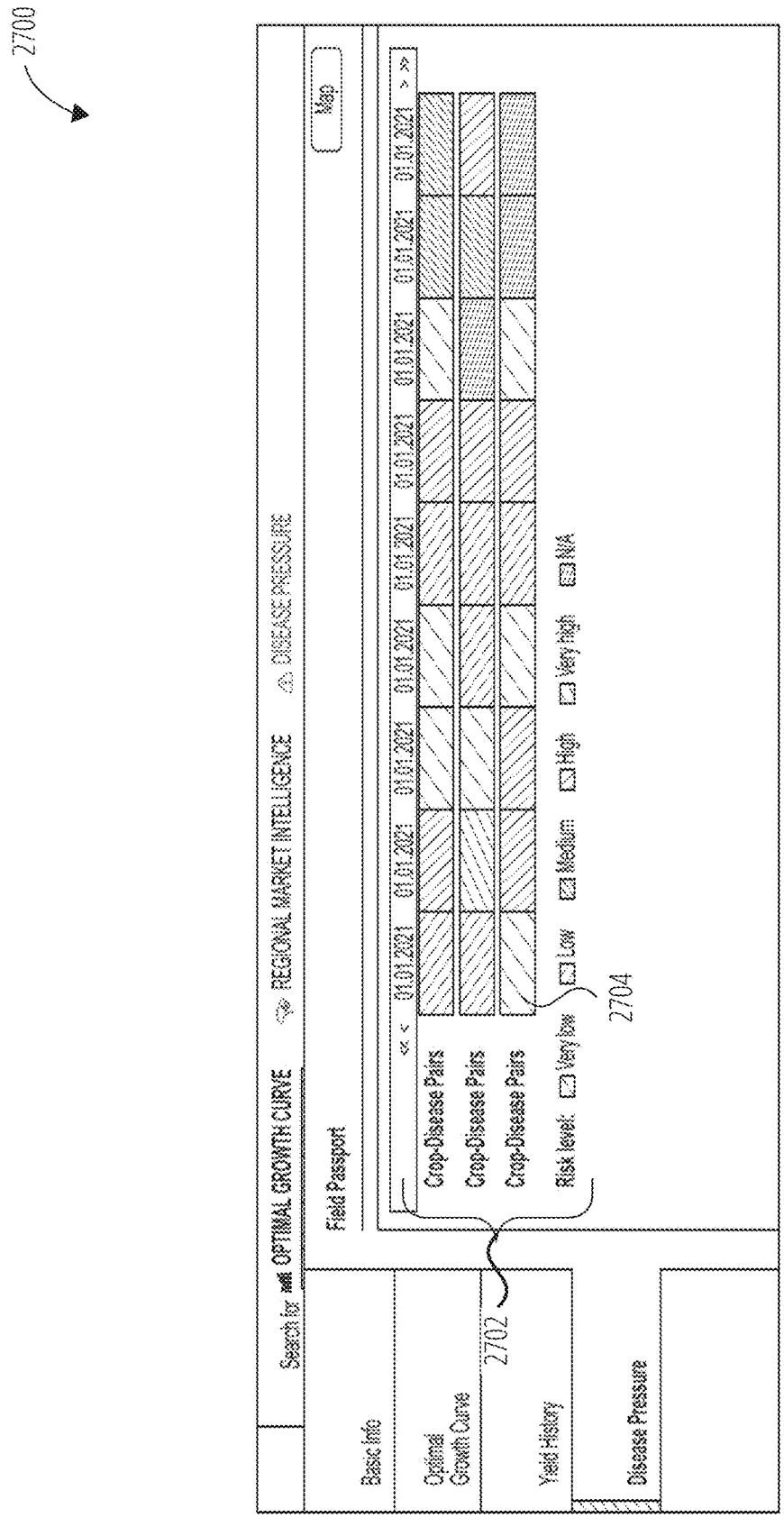

FIG. 27 illustrates an example user interface 2700 for a field passport for an individual farm field of interest, according to various embodiments of the present disclosure. In particular, the user interface 2700 displays a chart 2702 that provides a history of disease risk pressure of the individual farm field, for crop-disease pairs, over a range of different time points. As shown, individual elements (e.g., 2704) in the chart 2702 that are each shaded to visually represent an amount of disease risk pressure at a certain time point for a corresponding crop-disease pair. In FIG. 27, the darker shading the element, the larger the disk risk pressure that existed.

Machine Architecture

Figure 28:
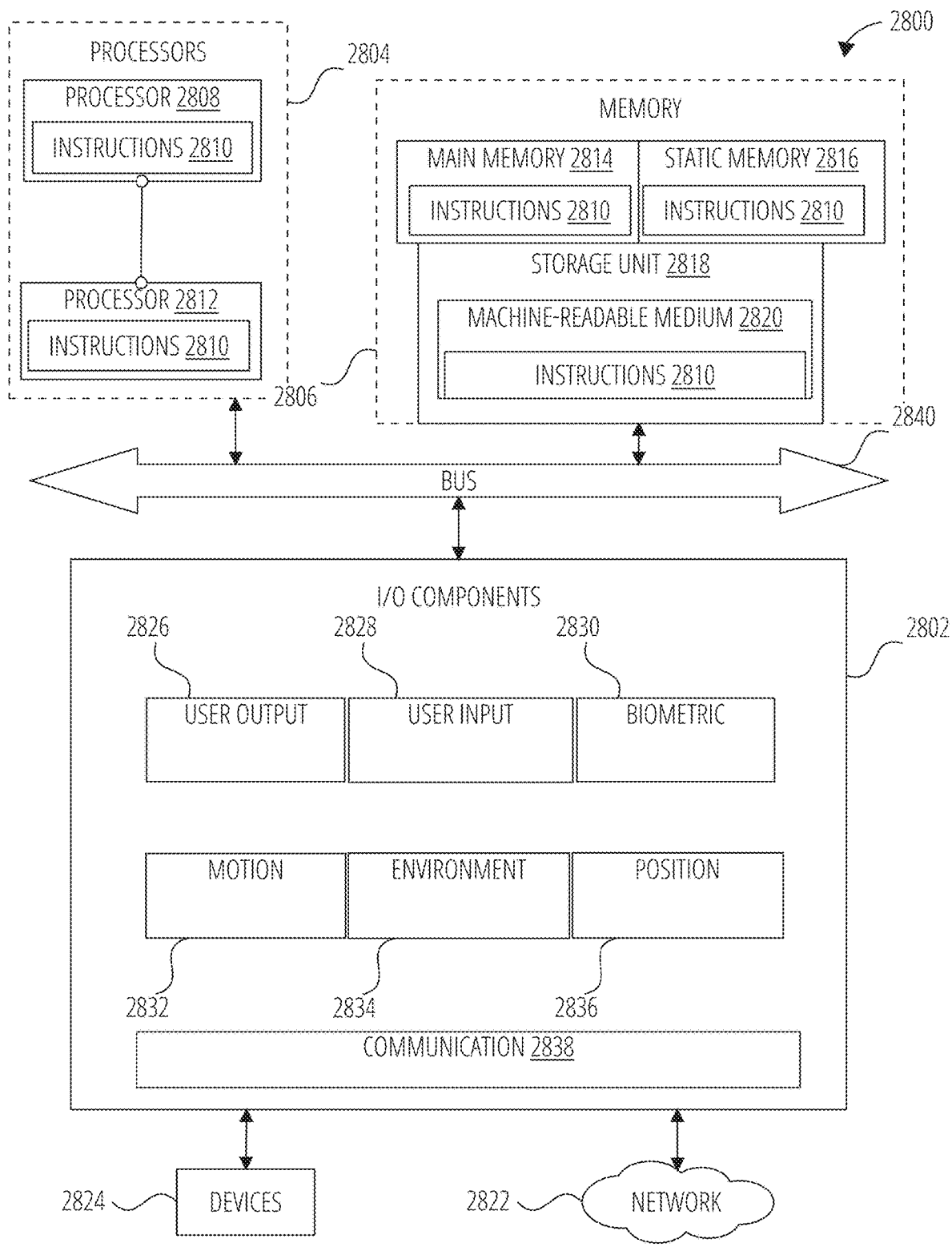
FIG. 28 is a diagrammatic representation of a machine in the form of a computer system within which a set of instructions may be executed for causing the machine to perform any one or more of the methodologies discussed herein, in accordance with some examples.

FIG. 28 is a diagrammatic representation of the machine 2800 within which instructions 2810 (e.g., software, a program, an application, an applet, air app, or other executable code) for causing the machine 2800 to perform any one or more of the methodologies discussed herein may be executed. For example, the instructions 2810 may cause the machine 2800 to execute any one or more of the methods described herein. The instructions 2810 transform the general, non-programmed machine 2800 into a particular machine 2800 programmed to carry out the described and illustrated functions in the manner described. The machine 2800 may operate as a standalone device or may be coupled (e.g., networked) to other machines. In a networked deployment, the machine 2800 may operate in the capacity of a server machine or a client machine in a server-client network environment, or as a peer machine in a peer-to-peer (or distributed) network environment. The machine 2800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2810, sequentially or otherwise, that specify actions to be taken by the machine 2800. Further, while only a single machine 2800 is illustrated, the term "machine" shall also be taken to include a collection of machines that individually or jointly execute the instructions 2810 to perform any one or more of the methodologies discussed herein. The machine 2800, for example, may comprise the client device 102 or any one of a number of server devices forming part of the server system 106. In some examples, the machine 2800 may also comprise both client and server systems, with certain operations of a particular method or algorithm being performed on the server-side and with certain operations of the particular method or algorithm being performed on the client-side.

The machine 2800 may include processors 2804, memory 2806, and input/output. I/O components 2802, which may be configured to communicate with each other via a bus 2840. In an example, the processors 2804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2808 and a processor 2812 that execute the instructions 2810. The term "processor" is intended to include multi-core processors that may comprise two or more independent processors (sometimes referred to as "cores") that may execute instructions contemporaneously. Although FIG. 28 shows multiple processors 2804, the machine 2800 may include a single processor with a single-core, a single processor with multiple cores (e.g., a multi-core processor), multiple processors with a single core, multiple processors with multiples cores, or any combination thereof.

The memory 2806 includes a main memory 2814, a static memory 2816, and a storage unit 2818, both accessible to the processors 2804 via the bus 2840. The main memory 2806, the static memory 2816, and storage unit 2818 store the instructions 2810 embodying any one or more of the methodologies or functions described herein. The instructions 2810 may also reside, completely or partially, within the main memory 2814, within the static memory 2816, within machine-readable medium 2820 within the storage unit 2818, within at least one of the processors 2804 (e.g., within the Processor's cache memory), or any suitable combination thereof, during execution thereof by the machine 2800.

The I/O components 2802 may include a wide variety of components to receive input, provide output, produce output, transmit information, exchange information, capture measurements, and so on. The specific I/O components 2802 that are included in a particular machine will depend on the type of machine. For example, portable machines such as mobile phones may include a touch input device or other such input mechanisms, while a headless server machine will likely not include such a touch input device. It will be appreciated that the I/O components 2802 may include many other components that are not shown in FIG. 28. In various examples, the I/O components 2802 may include user output components 2826 and user input components 2828. The user output components 2826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2802 may include biometric components 2830, motion components 2832, environmental components 2834, or position components 2836, among a wide array of other components. For example, the biometric components 2830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2832 include acceleration sensor components (e.g., accelerometer), gravitation sensor components, rotation sensor components (e.g., gyroscope).

The environmental components 2834 include, for example, one or cameras (with still images/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102. The rear cameras may, for example, be used to capture still images and videos in a more traditional camera mode. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 2836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2802 further include communication components 2838 operable to couple the machine 2800 to a network 2822 or devices 2824 via respective coupling or connections. For example, the communication components 2838 may include a network interface Component or another suitable device to interface with the network 2822. In further examples, the communication components 2838 may include wired communication components, wireless communication components, cellular communication components, Near Field Communication (NFC) components, Bluetooth® components (e.g., Bluetooth® Low Energy), components, and other communication components to provide communication via other modalities. The devices 2824 may be another machine or any of a wide variety of peripheral devices (e.g., a peripheral device coupled via a USB).

Moreover, the communication components 2838 may detect identifiers or include components operable to detect identifiers. For example, the communication components 2838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2838, such as location via Internet Protocol (IP) geolocation, location via Wi-Fi® signal triangulation, location via detecting an NFC beacon signal that may indicate a particular location, and so forth.

The various memories (e.g., main memory 2814, static memory 2816, and memory of the processors 2804) and storage unit 2818 may store one or more sets of instructions and data structures (e.g., software) embodying or used by any one or more of the methodologies or functions described herein. These instructions (e.g., the instructions 2810), when executed by processors 2804, cause various operations to implement the disclosed examples.

The instructions 2810 may be transmitted or received over the network 2822, using a transmission medium, via a network interface device (e.g., a network interface component included in the communication components 2838) and using any one of several well-known transfer protocols (e.g., hypertext transfer protocol (HTTP)). Similarly, the instructions 2810 may be transmitted or received using a transmission medium via a coupling (e.g., a peer-to-peer coupling) to the devices 2824.

Software Architecture

Figure 29:
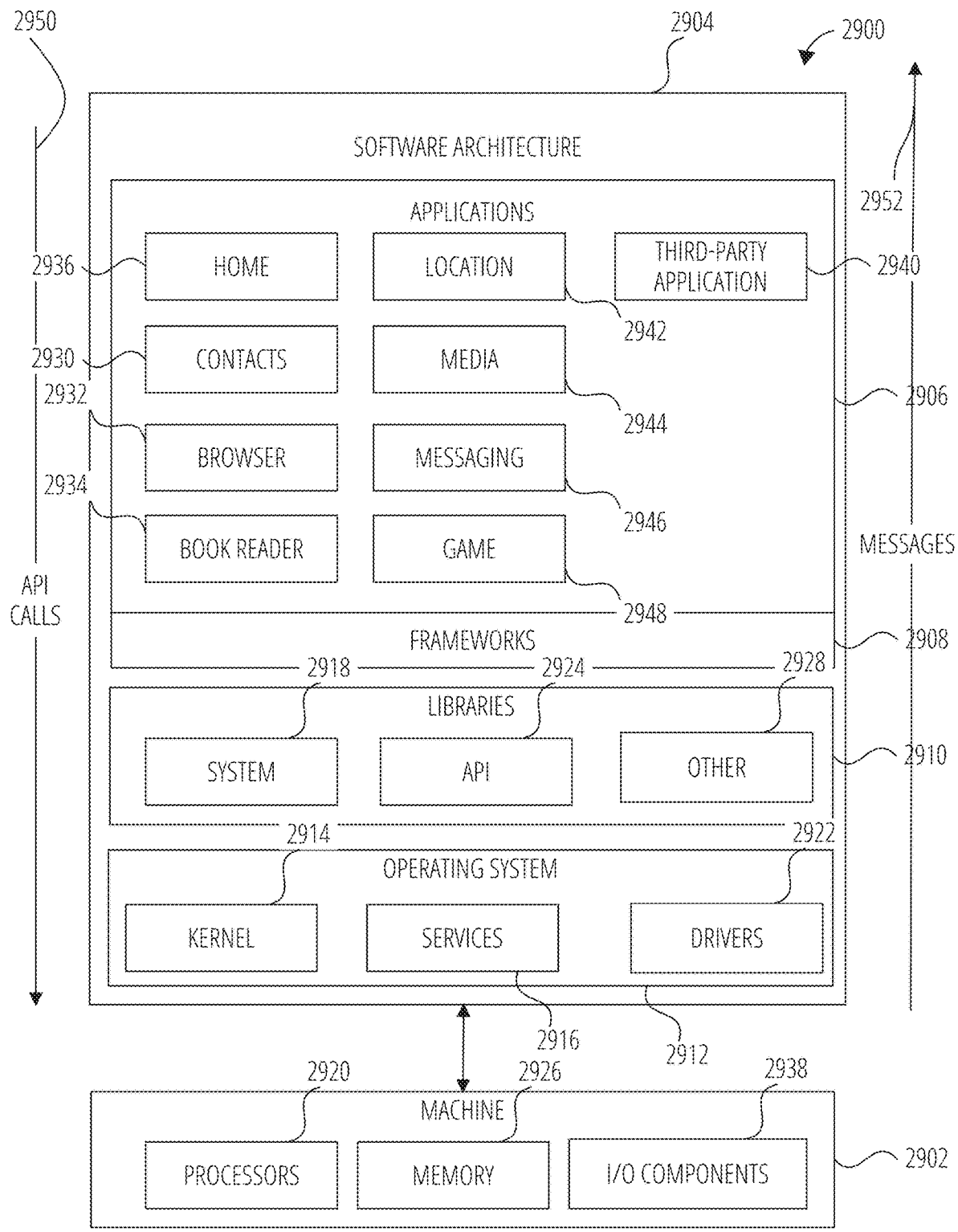
FIG. 29 is a block diagram showing a software architecture within which examples may be implemented.

FIG. 29 is a block diagram 2900 illustrating a software architecture 2904, which can be installed on any one or more of the devices described herein. The software architecture 2904 is supported by hardware such as a machine 2902 that includes processors 2920, memory 2926, and I/O components 2938. In this example, the software architecture 2904 can be conceptualized as a stack of layers, where each layer provides a particular functionality. The software architecture 2904 includes layers such as an operating system 2912, libraries 2910, frameworks 2908, and applications 2906. Operationally, the applications 2906 invoke API calls 2950 through the software stack and receive messages 2952 in response to the API calls 2950.

The operating system 2912 manages hardware resources and provides common services. The operating system 2912 includes, for example, a kernel 2914, services 2916, and drivers 2922. The kernel 2914 acts as an abstraction layer between the hardware and the other software layers. For example, the kernel 2914 provides memory management, processor management (e.g., scheduling), component management, networking, and security settings, among other functionality. The services 2916 can provide other common services for the other software layers. The drivers 2922 are responsible for controlling or interfacing with the underlying hardware. For instance, the drivers 2922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2910 provide a common low-level infrastructure used by the applications 2906. The libraries 2910 can include system libraries 2918 (e.g., C standard library) that provide functions such as memory allocation functions, string manipulation functions, mathematic functions, and the like. In addition, the libraries 2910 can include API libraries 2924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2910 can also include a wide variety of other libraries 2928 to provide many other APIs to the applications 2906.

The frameworks 2908 provide a common high-level infrastructure that is used by the applications 2906. For example, the frameworks 2908 provide various graphical user interface (GUI) functions, high-level resource management, and high-level location services. The frameworks 2908 can provide a broad spectrum of other APIs that can be used by the applications 2906, some of which may be specific to a particular operating system or platform.

In an example, the applications 2906 may include a home application 2936, a contacts application 2930, a browser application 2932, a book reader application 2934, a location application 2942, a media application 2944, a messaging application 2946, a game application 2948, and a broad assortment of other applications such as a third-party application 2940. The applications 2906 are programs that execute functions defined in the programs. Various programming languages can be employed to create one or more of the applications 2906, structured in a variety of manners, such as object-oriented programming languages (e.g., Objective-C, Java, or C++) or procedural programming languages (e.g., C or assembly language). In a specific example, the third-party application 2940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2940 can invoke the API calls 2950 provided by the operating system 2912 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed. Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
accessing, by a hardware processor, tile data describing a plurality of tile images for a geographic region over a period of time, the tile data comprising pixels and being generated based on satellite remote sensing data;
generating, by the hardware processor and based on the tile data, farm field pixel data for a farm field of interest, the farm field pixel data describing a plurality of pixels for the farm field of interest over the period of time;
generating, by the hardware processor and based on the farm field pixel data, vegetation index data for the farm field of interest by, for each individual pixel in the plurality of pixels:
generating an initial time series of vegetation index values for the individual pixel over the period of time; and
generating a reconstructed time series of vegetation index values for the individual pixel over the period of time by using a first machine learning model to generate a predicted vegetation index value for each vegetation index value in the initial time series of vegetation index values, the first machine learning model comprising a neural network model trained to reconstruct vegetation index values of all pixels of a field;
generating, by the hardware processor, a crop growth curve for the farm field of interest based on the vegetation index data;
generating, by the hardware processor, a crop growth band based on historical data that describes vegetation index values for one or more other farm fields in the geographic region;
causing, by the hardware processor, presentation of the crop growth band and the crop growth curve on a client graphical user interface on a client device, the crop growth band and the crop growth curve being presented relative to each other for comparison;
generating, using a second machine learning model, a simulated yield value for the field of interest based on the crop growth band; and
generating, by the hardware processor, one or more alerts based on the simulated yield value for the field of interest, the one or more alerts being reviewable by a user, at least one alert of the one or more alerts providing actionable information to the user for adjusting management of the field of interest.

2. The method of claim 1, wherein the generating of the crop growth curve for the farm field of interest based on the vegetation index data comprises:
generating a time series of average vegetation index values by averaging together all vegetation index values, for each time point in a range of time within the period of time, from all of the reconstructed time series of vegetation index values; and
generating the crop growth curve based on the time series of average vegetation index values.

3. The method of claim 1, wherein the generating of the crop growth band based on the historical data comprises:
selecting the one or more other farm fields from a plurality of farm fields in the geographic region;
selecting, from the one or more other farm fields, a subset of farm fields that each have a yield that is higher than a lower percentile threshold and lower than a higher percentile threshold;
generating a median vegetation index curve for those fields, in the subset of farm fields, that have a yield that is higher than a upper percentile threshold; and
generating the crop growth band based on the median vegetation index curve.

4. The method of claim 2, wherein the method comprises:
determining a regional yield estimate from the crop growth band;
determining a daily accumulated vegetation index value based on the time series of average vegetation index values; and
determining a daily change of vegetation index value based on the time series of average vegetation index values, the generating of the simulated yield value for the field of interest based on the crop growth band comprising generating the simulated yield value based on the regional yield estimate, the daily accumulated vegetation index, and the daily change of vegetation index value.

5. The method of claim 1, wherein the machine learning model as trained is configured to receive an input vegetation index value and generate an output vegetation index value that represents a correction of the input vegetation index value or a replacement of the input vegetation index value.

6. The method of claim 1, wherein a Mean Square Error (MSE) process is used to generate a learning metric for the machine learning model.

7. The method of claim 1, wherein each individual vegetation index value, in an individual time series for the individual pixel, being calculated based on a Normalized Difference Vegetation Index value computed for the individual pixel at a different time point within the period of time.

8. The method of claim 7, wherein the individual vegetation index value is calculated based on the Normalized Difference Vegetation Index value computed for the individual pixel by:
truncating the Normalized Difference Vegetation Index value for the individual pixel from 0 to 1; and
multiplying the truncated Normalized Difference Vegetation Index by a predetermined factor of 100.

9. A non-transitory computer-readable storage medium including instructions that, when processed by a hardware processor, causes the hardware processor to perform operations comprising:
- accessing tile data describing a plurality of tile images for a geographic region over a period of time, the tile data comprising pixels and being generated based on satellite remote sensing data;
- generating, based on the tile data, farm field pixel data for a farm field of interest, the farm field pixel data describing a plurality of pixels for the farm field of interest over the period of time;
- generating, based on the farm field pixel data, vegetation index data for the farm field of interest by, for each individual pixel in the plurality of pixels:
  - generating an initial time series of vegetation index values for the individual pixel over the period of time; and
  - generating a reconstructed time series of vegetation index values for the individual pixel over the period of time, by using a first machine learning model to generate a predicted vegetation index value for each vegetation index value in the initial time series of vegetation index values, the first machine learning model comprising a neural network model trained to reconstruct vegetation index values of all pixels of a field;
- generating a crop growth curve for the farm field of interest based on the vegetation index data;
- generating a crop growth band based on historical data that describes vegetation index values for one or more other farm fields in the geographic region;
- causing presentation of the crop growth band and the crop growth curve on a client graphical user interface on a client device, the crop growth band and the crop growth curve being presented relative to each other for comparison;
- generating, using a second machine learning model, a simulated yield value for the field of interest based on the crop growth band; and
- generating one or more alerts based on the simulated yield value for the field of interest, the one or more alerts being reviewable by a user, at least one alert of the one or more alerts providing actionable information to the user for adjusting management of the field of interest.

10. The non-transitory computer-readable storage medium of claim 9, wherein the generating of the crop growth curve for the farm field of interest based on the vegetation index data comprises:
- generating a time series of average vegetation index values by averaging together all vegetation index values, for each time point in a range of time within the period of time, from all of the reconstructed time series of vegetation index values; and
- generating the crop growth curve based on the time series of average vegetation index values.

11. The non-transitory computer-readable storage medium of claim 9, wherein the generating of the crop growth band based on the historical data comprises:
- selecting the one or more other farm fields from a plurality of farm fields in the geographic region;
- selecting, from the one or more other farm fields, a subset of farm fields that each have a yield that is higher than a lower percentile threshold and lower than a higher percentile threshold;
- generating a median vegetation index curve for those fields, in the subset of farm fields, that have a yield that is higher than an upper percentile threshold; and
- generating the crop growth band based on the median vegetation index curve.

12. The non-transitory computer-readable storage medium of claim 10, wherein the operations comprise:
- determining a regional yield estimate from the crop growth band;
- determining a daily accumulated vegetation index value based on the time series of average vegetation index values; and
- determining a daily change of vegetation index value based on the time series of average vegetation index values, the generating of the simulated yield value for the field of interest based on the crop growth band comprising generating the simulated yield value based on the regional yield estimate, the daily accumulated vegetation index, and the daily change of vegetation index value.

13. The non-transitory computer-readable storage medium of claim 9, wherein the machine learning model as trained is configured to receive an input vegetation index value and generate an output vegetation index value that represents a correction of the input vegetation index value or a replacement of the input vegetation index value.

14. The non-transitory computer-readable storage medium of claim 9, wherein a Mean Square Error (MSE) process is used to generate a learning metric for the machine learning model.

15. The non-transitory computer-readable storage medium of claim 9, wherein each individual vegetation index value, in an individual time series for the individual pixel, being calculated based on a Normalized Difference Vegetation Index value computed for the individual pixel at a different time point within the period of time.

16. The non-transitory computer-readable storage medium of claim 15, wherein the individual vegetation index value is calculated based on the Normalized Difference Vegetation Index value computed for the individual pixel by:
- truncating the Normalized Difference Vegetation Index value for the individual pixel from 0 to 1; and
- multiplying the truncated Normalized Difference Vegetation Index by a predetermined factor of 100.

17. A system comprising:
a hardware processor; and
a memory storing instructions that, when executed by the processor, cause the hardware processor to perform operations comprising:
- accessing tile data describing a plurality of tile images for a geographic region over a period of time, the tile data comprising pixels and being generated based on satellite remote sensing data;
- generating, based on the tile data, farm field pixel data for a farm field of interest, the farm field pixel data describing a plurality of pixels for the farm field of interest over the period of time;
- generating, based on the farm field pixel data, vegetation index data for the farm field of interest by, for each individual pixel in the plurality of pixels:
  - generating an initial time series of vegetation index values for the individual pixel over the period of time; and
  - generating a reconstructed time series of vegetation index values for the individual pixel over the period of time, by using a first machine learning model to generate a predicted vegetation index value for each vegetation index value in the initial time series of vegetation index values, the first machine learning model comprising a neural network model trained to reconstruct vegetation index values of all pixels of a field;

generating a crop growth curve for the farm field of interest based on the vegetation index data;

generating a crop growth band based on historical data that describes vegetation index values for one or more other farm fields in the geographic region;

causing presentation of the crop growth band and the crop growth curve on a client graphical user interface on a client device, the crop growth band and the crop growth curve being presented relative to each other for comparison;

generating, using a second machine learning model, a simulated yield value for the field of interest based on the crop growth band; and generating one or more alerts based on the simulated yield value for the field of interest, the one or more alerts being reviewable by a user, at least one alert of the one or more alerts providing actionable information to the user for adjusting management of the field of interest.

18. The system of claim 17, wherein the generating of the crop growth curve for the farm field of interest based on the vegetation index data comprises:

generating a time series of average vegetation index values by averaging together all vegetation index values, for each time point in a range of time within the period of time, from all of the reconstructed time series of vegetation index values; and generating the crop growth curve based on the time series of average vegetation index values.

19. The system of claim 17, wherein the generating of the crop growth band based on the historical data comprises:

selecting the one or more other farm fields from a plurality of farm fields in the geographic region;

selecting, from the one or more other farm fields, a subset of farm fields that each have a yield that is higher than a lower percentile threshold and lower than a higher percentile threshold;

generating a median vegetation index curve for those fields, in the subset of farm fields, that have a yield that is higher than an upper percentile threshold; and generating the crop growth band based on the median vegetation index curve.

* * * * *